United States Patent [19]

Giokas et al.

[11] Patent Number: 5,408,602
[45] Date of Patent: Apr. 18, 1995

[54] SYSTEM AND METHOD FOR EMULATING A WINDOW MANAGEMENT ENVIRONMENT HAVING A UNIFORM WINDOWING INTERFACE

[76] Inventors: Dennis G. Giokas, 8 Kyle Dr., Nashua, N.H. 03062; Cynthia A. Desrochers, 40 Sycamore Dr., Leominster, Mass. 01453

[21] Appl. No.: 268,383

[22] Filed: Jun. 29, 1994

Related U.S. Application Data

[63] Continuation of Ser. No. 560,725, Jul. 31, 1990, abandoned.

[51] Int. Cl.⁶ .............................................. G06F 15/62
[52] U.S. Cl. .................................... 395/157; 395/200; 395/500
[58] Field of Search ........................... 395/155-161, 395/162-166, 200, 500, 700, 650; 345/117-120

[56] References Cited

U.S. PATENT DOCUMENTS

| | | | |
|---|---|---|---|
| 4,550,386 | 10/1985 | Hirsawa et al. | 340/721 X |
| 4,688,170 | 9/1986 | Waite et al. | 340/717 X |
| 4,804,950 | 2/1989 | Moon et al. | 340/715 |
| 4,823,108 | 4/1989 | Pope | 395/157 X |
| 4,899,136 | 2/1990 | Beard et al. | 395/159 |
| 4,965,559 | 10/1990 | Dye | 340/717 |
| 4,974,173 | 11/1990 | Stetik et al. | 395/159 |
| 4,989,136 | 1/1991 | Friendman et al. | 340/825.059 |
| 5,020,003 | 5/1991 | Moshenberg | 395/164 |
| 5,036,315 | 7/1991 | Gurley | 395/157 X |

FOREIGN PATENT DOCUMENTS 0237671 9/1987 European Pat. Off. ..... G06F 6/455

OTHER PUBLICATIONS

Young, "X Window Systems", Prentice-Hall, 1989, pp. 1-42.
Jones, "Introduction to the X Window System", Prentice-Hall, 1988, pp. 27-64.
XVision, Visionware Limited, 1989, Doc. No. 0080194.
XVision product brochure, dated Dec. 1989, VisionWare Limited Document No. 0080194.
"System Design for Compatibility of a High-Performance Graphics Library and the X Window System," Hewlett-Packard Journal, Dec. 1989 K. Bronstein, D. Sweetser, and W. Yoder.
IBM Technical Disclosure Bulletin, vol. 28, No. 8, Jan. 1986, New York, U.S. pp. 3258-3259. 'Display Emulation' p. 3258, line 19-p. 3259, line 2.

*Primary Examiner*—Mark R. Powell
*Assistant Examiner*—John E. Breene
*Attorney, Agent, or Firm*—Arthur W. Fisher; Denis G. Maloney; Mark J. Casey

[57] ABSTRACT

An X window display server provides a virtual window manager client that, from the viewpoint of client programs connected to the server, is indistinguishable from a real window manager client. The emulated window manager is implemented as an internal server client.

24 Claims, 17 Drawing Sheets

300

```
typedef struct _ Window {
730~ HWND       hPMWnd;            /* handle to PM window */
720~ unsigned   HASBEENMAPPED      /* Added for sizing and move messages */
     DrawableRec drawable;
     WindowPtr  parent;            /* ancestor chain */
     WindowPtr  nextSib;           /* next lower sibling */
     WindowPtr  prevSib;           /* next higher sibling */
     WindowPtr  firstChild;        /* top-most child */
     WindowPtr  lastChild;         /* bottom-most child */
     RegionRec  winSize;
     RegionRec  borderSize;
     DXXPointRec origin;           /* position relative to parent */
     unsigned short borderWidth;
     Mask       deliverableEvents;
     Mask       eventMask;
     PixUnion   background;
     PixUnion   border;
     WindowOptPtr optional;
     unsigned   backgroundState;   /* None, Relative, Pixel, Pixmap */
     unsigned   borderIsPixel;
     unsigned   cursorIsNone;      /* else same as parent */
     unsigned   bitGravity;
     unsigned   winGravity;
     unsigned   overrideRedirect;
     unsigned   visibility;
     unsigned   mapped;
     unsigned   realized;          /* ancestors are all mapped */
     unsigned   viewable;          /* realized && InputOutput */
     unsigned   dontPropagate;     /* index into DontPropagateMasks */
     DevUnion   *devPrivates;
} WindowRec;
```

SYSTEM AND METHOD FOR EMULATING A WINDOW MANAGEMENT ENVIRONMENT HAVING A UNIFORM WINDOWING INTERFACE

This application is a continuation of application Ser. No. 07/560,725, filed Jul. 31,1990, now abandoned.

BACKGROUND OF THE INVENTION

This invention relates generally to systems for providing graphics environments for application programs, and more particularly to common window management interfaces for systems capable of running multiple application programs written for various environments.

In modern data processing, protocols allow application programs to communicate with system components such as I/O devices or servers. These protocols include application programming interfaces, interprocess communication protocols, and remote procedure calls. With the rapid growth of computers and application programs, there has been a parallel growth in the number of software and hardware protocols. The existence of multiple protocols throughout the data processing industry has been a source of inconvenience because application programs written for one protocol must be modified, rewritten, or even redesigned, for a different protocol.

The problem of multiple protocols is particularly acute in the graphics area where there are a number of standards in use. Certain graphics systems use a software package called a display server to implement a graphics protocol. In such systems, application programs requesting graphics services, called clients, send their graphics requests to the display server.

The graphic services can include window management. Windows are areas on a video screen that allow a user to view data processing output. Windows also give application programs an organized way of managing the use of space on the screen, and allow the display server to present information for multiple application programs in an organized way. If clients want windows, another software package called a "window manager" is generally used to control certain window management functions.

By using a window manager, individual clients need not be concerned with window management functions, such as the positioning and sizing of windows. An example of a graphics system having a window manager common to a number of clients is one defined by the X Window System protocol, a standard developed at the Massachusetts Institute of Technology. FIG. 1 shows an X Window system, where client 110, 120, and 130 send graphics request to X display server 140, thereby communicating with graphics hardware 150. Client 130 is a window manager that can provide window management functions to both clients 110 and 120.

Basic principles and architecture of the X Window System may be found in "Introduction to the X Window System" by Oliver Jones, Prentice-Hall 1989. The protocol for communicating with an X Window display server is described in "X Window System Protocol MIT X Consortium Standard X Version 11," Release 4, by Robert W. Scheifler, MIT Laboratory for Computer Science. Conventions for communicating with the window manager, and with other clients, are described in "Inter-Client Communication Conventions Manual, Version 1.0, MIT X Consortium Standard," by David S.H. Rosenthal, Sun Microsystems, Inc.

X Window Systems are not the only graphics systems in use throughout the industry. Therefore, it may be necessary to execute clients written for an X Window System together with clients written for some other type of windowing system on a common set of graphics hardware. For purposes of the discussion that follows, the other type of windowing system will be referred to generically as a "host system."

One proposal for providing window management functions for a data processing system running both clients using the X Window System protocol ("X clients") and clients using the host system protocol ("host clients") is shown in FIG. 2. FIG. 2 shows a unified window system 200 serving both X display server clients 210 and 220 and host server clients 230, 240 and 250. A common window manager 260 is provided to present a uniform window interface to the user. An X server front end 270 implementing the X display server shares common support functions 290 (conventions, code, data structures, hardware access structures, etc.) with a host server front end 280 implementing the host server, thereby allowing hardware resources to be harmoniously allocated.

System 200, however, has several disadvantages. First it requires writing both an X display server front end and a host server front end. Second, it is not easy to build system 200 from existing host systems because of the many modifications required.

FIG. 3 is an example of an existing host system 300 which supports host system clients 310, 320, and 330. System 300 also includes a host server 340, including an internal window manager, to provide graphics functions to host system clients 310, 320 and 330.

Converting system 300 of FIG. 3 into system 200 shown in FIG. 2 presents both legal and technological problems. For example, the person attempting to implement the X display server in system 300 might not possess the legal right to modify the support technology used in the host server 340. Also, the support technology of the host server may be poorly documented or structured in such a way as to make it difficult or impossible to adapt to support another server. Therefore, it is desirable not to have to modify existing host systems.

FIG. 4 shows another proposal to solve the X-server/host system integration problem. In system 400 shown in FIG. 4, host clients 410, 420, and 430 of the host system are connected to a host server 440 that includes window management functions. Another host client 450 is an X display server that operates by translating X protocol to host protocol. X clients 460 and 470, which are written with the X protocol, are coupled to client 450 and thus can run using the graphics hardware 490 attached to host server 340 as host clients 410, 420 and 430 do.

In an X Window System, the common window manager is the window manager client. This window manager client is connected to the X display server, as are X clients. Clients send requests to the X display server to effect graphics operations. Certain requests sent from X clients to the X display server are redirected by the X display server to the window manager client. The window manager client then processes the request, and may then send a request to the X display server. Other certain requests sent from X client to the X display server are processed by the X display server and notification is sent to the window manager client.

When using the different types of clients in a single system as described above, it is desirable to present a user with a uniform user interface. One way to achieve this would be to tailor the window manager 480 of the X type system to have the window interface of the host system. One disadvantage of system 400 is that the process responsible for starting window manager 480 would need to have knowledge of the type of host system in order to allow it to select a manager having the window interface of the host system. If the host system changes, a new window manager 480 is required. This is a problem because the process starting the window manager may exist on a network node separate from the host system, where it may be difficult to obtain knowledge of the type of host system. The separation of window manager 480 from X server 450 can make it difficult to track changes to the host system.

SUMMARY AND OBJECTS OF THE INVENTION

It is therefore an object of this invention to provide a display server that can be implemented using the support technology of another server.

It is a further object of this invention to allow clients written with various types of protocols to run together on one set of graphics hardware.

It is still a further object of this invention for the window management interface presented to the user to be consistent between clients written with the various protocols.

Briefly, this invention emulates a window management structure in a display server. This ensures that there will always be an appropriate window manager for the clients that will present a uniform window interface to the user.

To achieve these and other objects of the present invention, in a computer system having a display server to provide centralized display functions to a client, a method of responding to a request for graphics operations generated by the client, the request including at least one function, comprises the steps, executed by the display server, of receiving a request for a graphics operation from the client; determining whether the graphics operation request requires performance of window management functions; submitting the graphics operation request to an emulated window management structure in the display server to perform any window management functions required by the graphics operation request; and executing the functions in the graphics operation request directly which do not require window management functions.

According to another aspect of the invention, A computer system for providing centralized windowing mechanisms to clients comprises a display; client processor means for executing the clients which generate requests for graphics operations to be implemented on the display; and server processor means, coupled to the display and to the client processor means, for responding to the graphics operation requests generated by clients. The server processor means includes an emulated management structure for providing window management functions, means for receiving the graphics operation requests for graphics operations from the clients, means, coupled to the receiving means, for determining whether the graphics operation requests for graphics operations requires performance of window management functions, means, coupled to the receiving means and to the determining means, for directly executing the functions of the graphics operation requests which do not require window management functions, and means, coupled to the receiving means and to the determining means, for submitting to the emulated management structure the functions of the graphics operation requests which do require window management functions.

The accompanying drawings, which are incorporated in and which constitute a part of this specification, illustrate one embodiment of the invention and, together with the description, explain the principles of the invention.

BRIEF DESCRIPTION OF THE DRAWINGS

FIG. 7 shows a typical internal window data structure according to a preferred embodiment of the present invention.

DESCRIPTION OF THE PREFERRED EMBODIMENT

Reference will now be made in detail to a presently preferred embodiment of the invention, an example of which is illustrated in the accompanying drawings.

Figure 5:
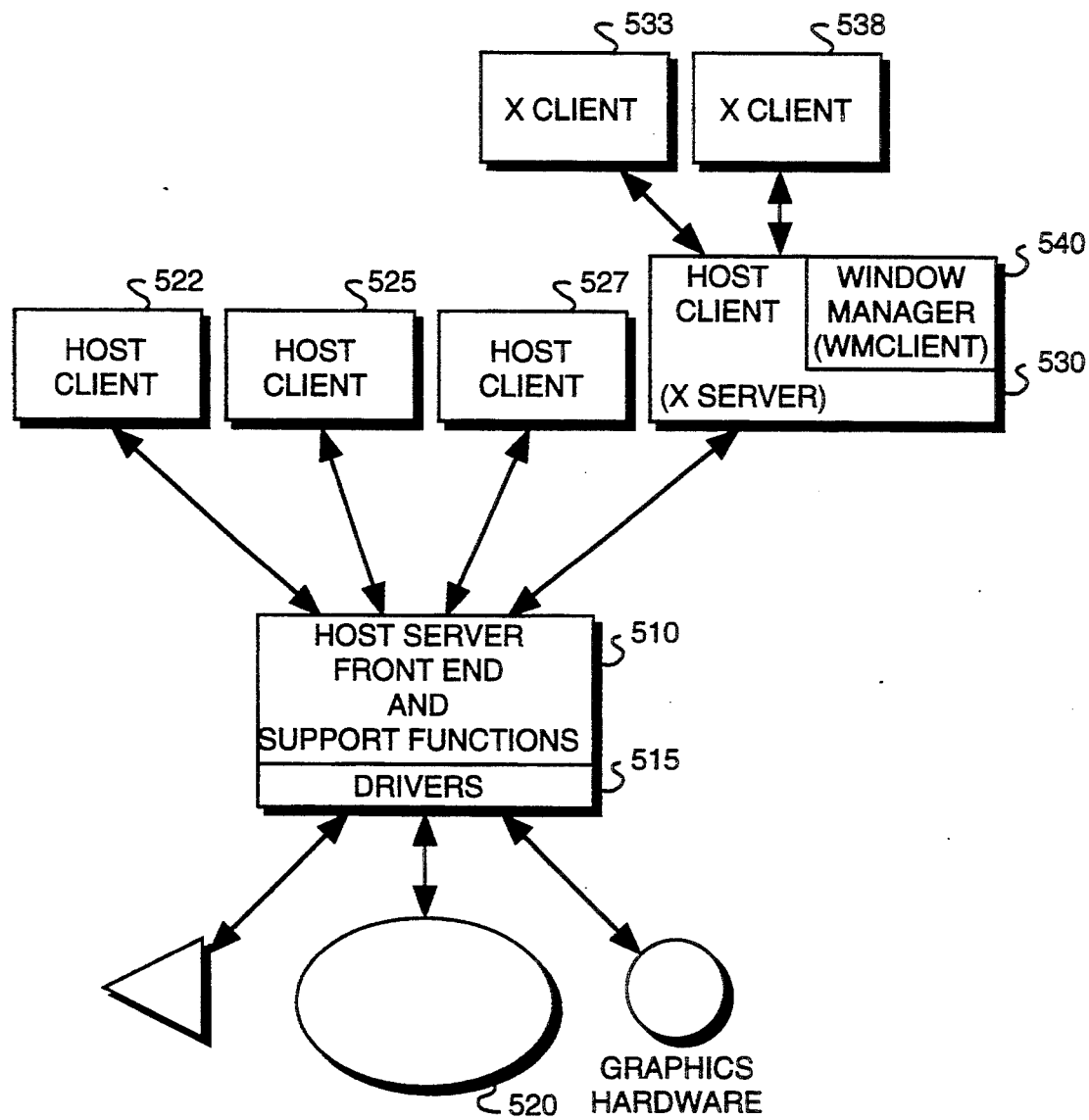
FIG. 5 shows a diagram of the elements of graphics system according to a preferred embodiment of the present invention.

FIG. 5 shows a preferred embodiment of the data processing system of this invention. A data processing system 500 includes a host server 510, coupled to graphics hardware 520 via drivers 515, to provide window management services to host clients 522, 525, and 527.

Display 530, which is also coupled to host server 510, preferably implements the X Window System protocol. Although display server 530 is configured using X Window System protocol, the invention can be practiced with any graphics system having a common window manager reconfigurable separate from the server.

The implementation of display server 530 as a client of host server 510 is not described in detail because it is believed that an acceptable implementation can be designed by persons of ordinary skill having knowledge of both servers. For example, other X servers that communicate with the display through a host server have been designed, including XVision, a Microsoft Windows-based X server, marketed by Visionware Limited; and Mac X, an Apple Macintosh-based X server.

In the preferred embodiment of the present invention, the presence and functionality of an X window manager client (WMCLIENT) 540 is emulated within the X display server 530. This emulation is invisible to X clients 533 and 538 which cannot detect whether they are running in a conventional X Window System or in an X Window System according to the preferred embodiment of the present invention where the WMCLIENT 540 is emulated within the display server 530. The display server 530 in this case supplies a virtual window manager to the operating environment of the X clients.

In a preferred embodiment, the host server 510 is the Microsoft Operating System/2 Presentation Manager (PM). The host server 510, however, is not restricted to the PM, and in fact could be any graphics system having sufficient functionality to support the protocol of the system being implemented, which is the X Window System in the preferred embodiment.

A. Overview of Server/Window manager Functionality

X window clients send "requests" to the X window server to perform graphics functions. A request is a type of message. For example, the CreateWindow request designates that a new window be created.

The X Window server, in turn generates "events" to inform clients of the status of a window. For example, the CreateNotify event indicates that a certain window has been created. When the CreateNotify event is generated for a window, it is sent to clients that have designated CreateNotify as one of the events they wish to receive for that window, by setting an appropriate bit in an event mask for that window's parent.

Figure 6:
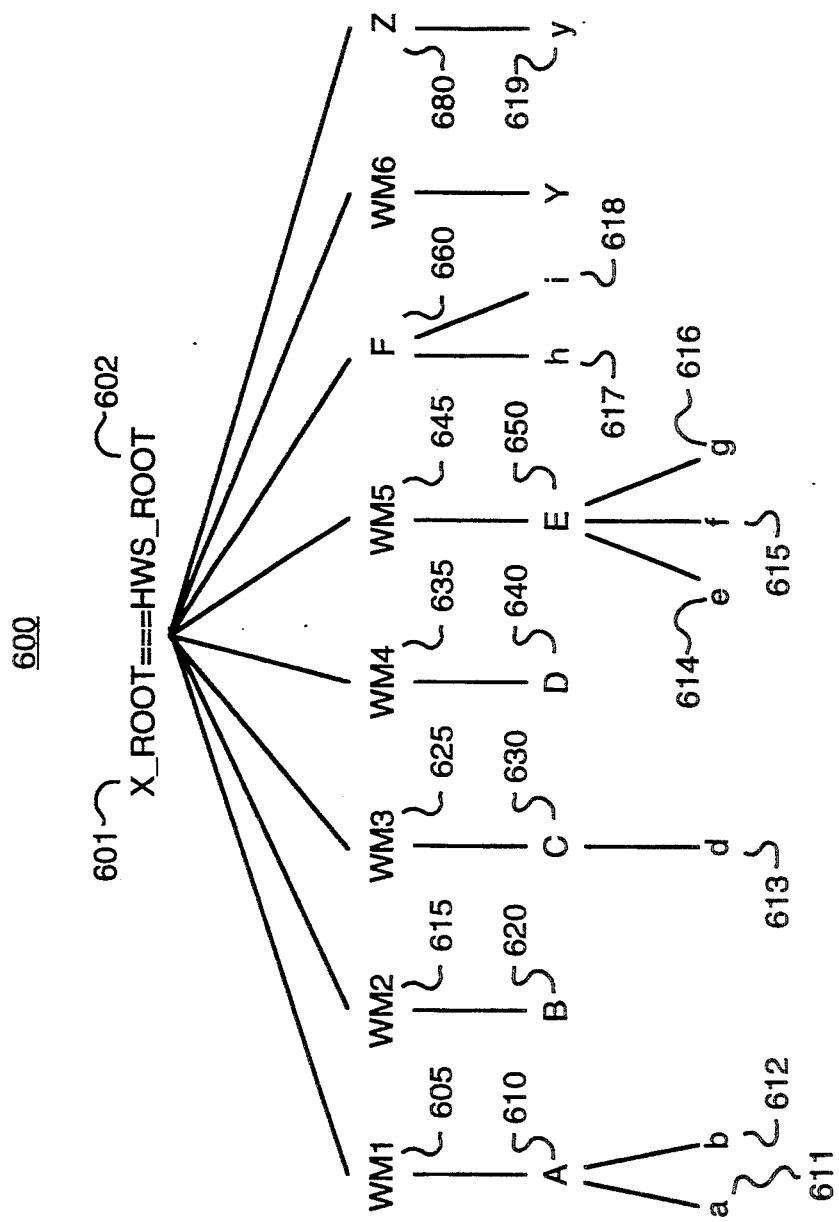
FIG. 6 shows a diagram of the window hierarchy according to a preferred embodiment of the present invention.

FIG. 6 includes a diagram 600 of a window hierarchy implemented according to the preferred embodiment of the present invention. In the X Window System, a window is the child of a single parent window. All client-created windows are descendent from a common X root window, shown as X_ROOT 601 in FIG. 6. In the preferred embodiment the X root window X_ROOT 601 is also the host system root window, shown as HWS_ROOT 602 in FIG. 6.

In the X Window System, a window is owned by a single client that creates the window by issuing a CreateWindow request.

The functionality of window manager client (WMCLIENT) 540 will now be described with reference to FIG. 6, which shows an X window tree after the X window server has processed a number of CreateWindow requests. A Child of the root window that is designated to be window-managed (by creating the window without an override-redirect attribute) may be created by an X client. For example, windows A 610, B 620, C 630, D 640 and E 650 in FIG. 6 were each created as children of the root windows.

From a user client point of view, when the client makes a request of server 530 to create a window managed window, for example window A 610, the window is created as a child of the X root window. After that, WMCLIENT 540 creates a corresponding window, for example window WM1 605 in FIG. 7 and "reparents" window A 610 to be the child of WM1 605. The WMCLIENT 540 then generates a ReparentNotify event for window A 605, thereby informing clients of the reparenting of the window.

Thereafter, when a client, such as X client 533 in FIG. 5, makes a request of display server 530 in FIG. 5 to map (make visible) a window managed window, for example window A 610, the request is redirected to WMCLIENT 540 which then makes a request to map both window A 610 and WM1 605. UnmapWindow and DestroyWindow requests are also directed to WMCLIENT 540.

Figure 1:
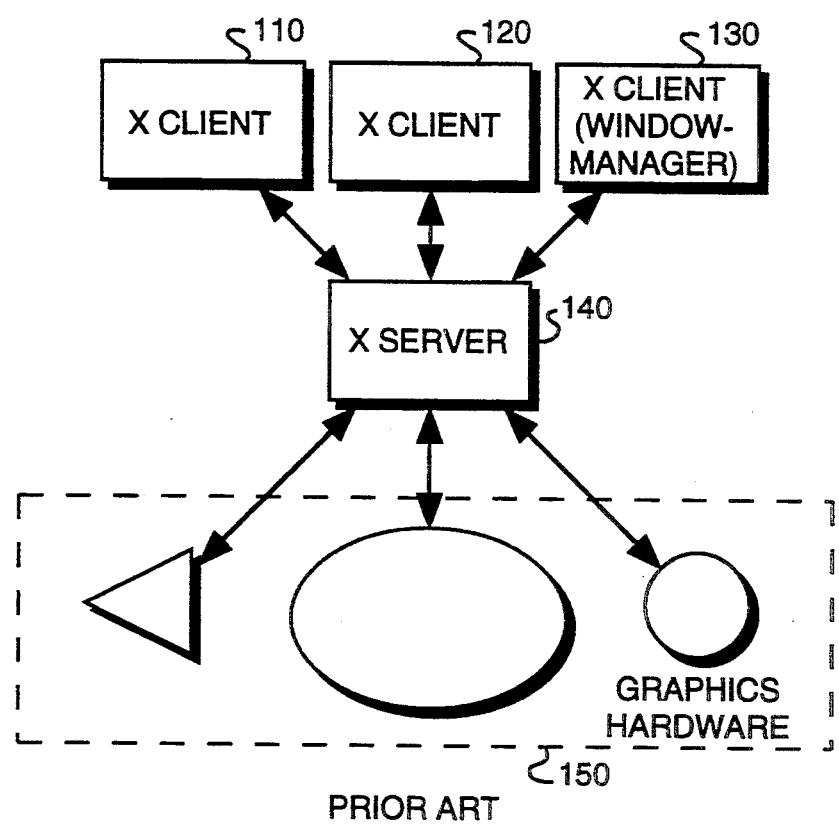
FIG. 1 shows a diagram of a prior art X Window graphics system.
Figure 2:
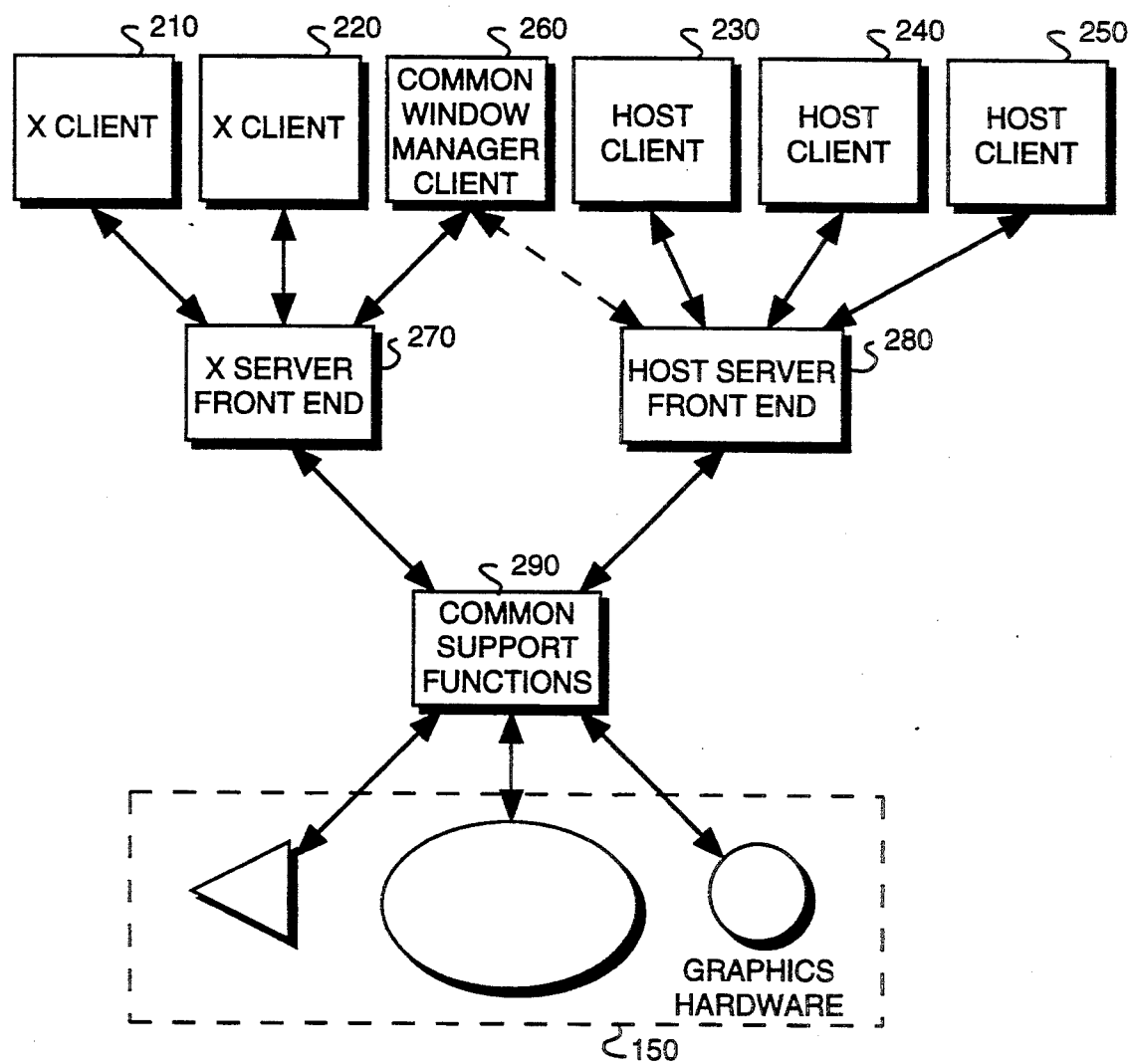
FIG. 2 shows a diagram of a proposed unified multiserver graphics system.
Figure 3:
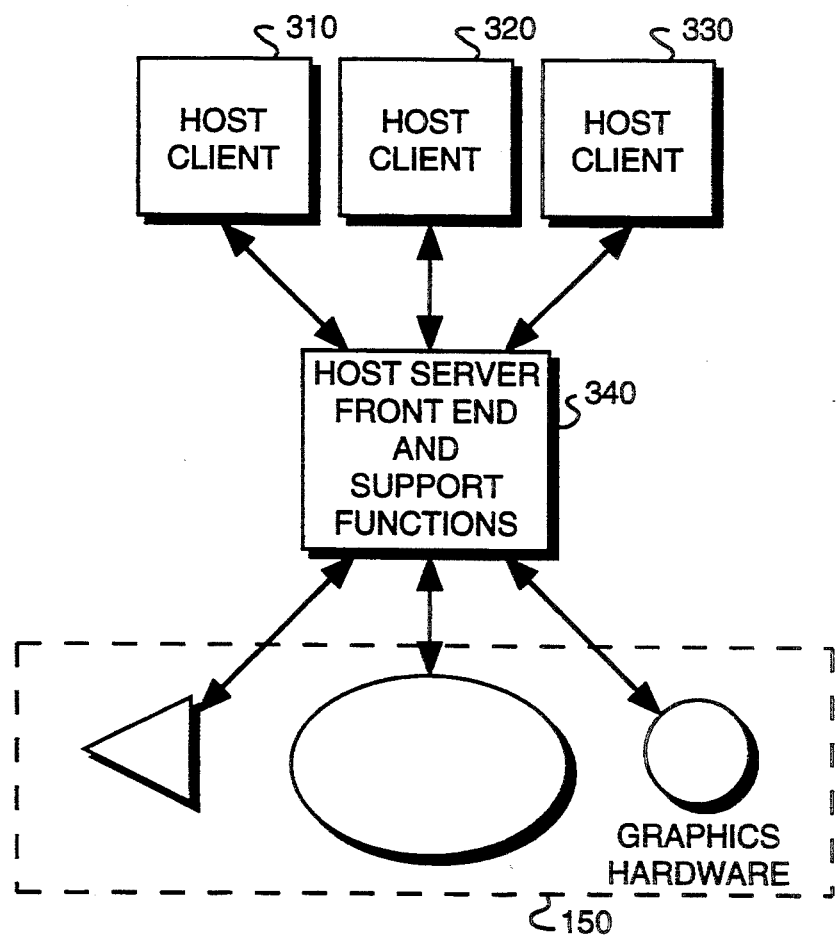
FIG. 3 shows a diagram of a prior art single server graphics and window management system.
Figure 4:
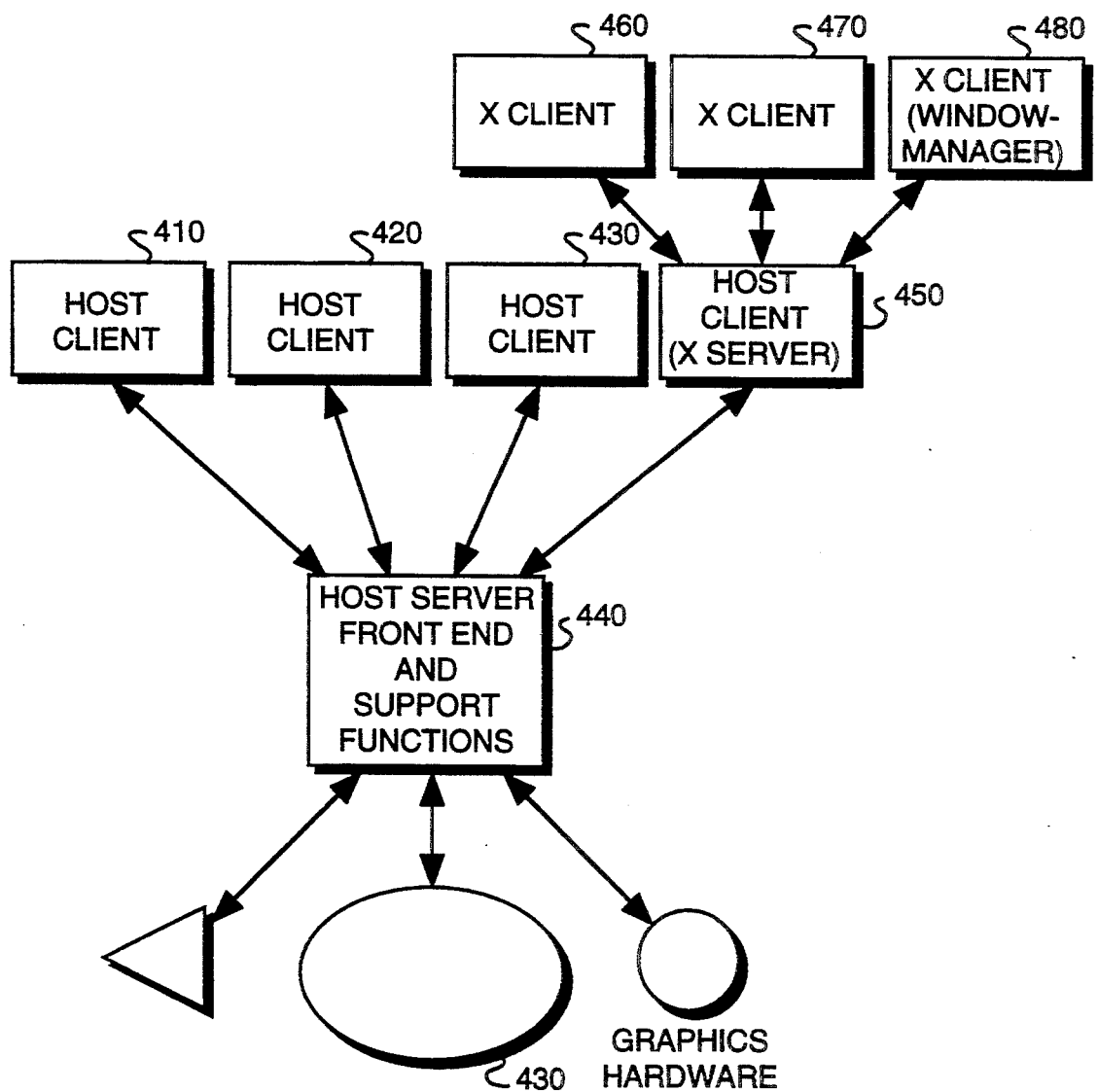
FIG. 4 shows a diagram of a X Window graphics system layered over a host graphics system.

Similar to the operation of a real window manager, such as window manager 330 in FIG. 3, the virtual window manager WMCLIENT 540 of the preferred embodiment does not interfere with the creation, mapping, unmapping, or destroying of a window that a client does not wish to be window managed. A client in this case creates the window with the override-redirect attribute in the CreateWindow request. For example, windows F 660 and Z 680 were created with the override-redirect attribute. Regardless of the override-redirect attribute, WMCLIENT 540 does not interfere with request processing of windows that were not created as the child of the X root window X_ROOT 601. Thus, for example windows a 611, b 612, d 613, e 614, f 615, g 616, h 617, i 618 and y 619 were not created as the child of X root window X_ROOT 601. Therefore they will not be managed.

B. Overview of Server/Window Manager Client Architecture

A preferred embodiment for the display server 530 containing WMCLIENT 540 is a modified version of the X Window System sample server Version 11, Release 4, published by MIT, and the Microsoft Operating System/2 Presentation Manager (PM) graphics system. The modifications to the server are needed to emulate a window manager. Thus, display server 530 differs from the X window sample server in both data structure and control flow. For example, the sample server has calls to a device dependent layer (DDX). In display server 530, routines of the DDX layer contain calls to PM.

In the preferred embodiment of the invention shown in FIG. 5, the host server 510, has internal window management functions. WMCLIENT 540 takes advantage of this implementation of window management functions inside of the host server 510 by delegating window management functions to host server 510. This delegation has two principal advantages. First, WMCLIENT 540 can supply window management functions to X clients without implementing those functions within WMCLIENT 540 itself. Second, X client managed windows inherit the windowing interface of the PM system so that X clients will have a common window interface with host clients ("PM clients").

With regard to the first advantage, windows WM1 605, WM2 615, WM3 625, WM4 635, and WM5 645 in FIG. 6 are created as "PM frame" windows in server 510. PM frame windows contain various standard user interface objects such as buttons and menus, which a user can manipulate to perform functions such as moving a window. WMCLIENT 540 need not have knowledge of or capability to generate these user interface objects, and need only be concerned with the results of the user's manipulation of these objects. As explained below, WMCLIENT 540 learns of the results of a user's manipulation of these objects by receiving PM events. For example, a user may select a button to move a window, resulting in WMCLIENT 540 receiving a PM move window event, WM_MOVE.

An additional advantage of delegating window management to server 510 is that, if the host system interface were to change, the X window interface provided by WMCLIENT 540 would tend to remain compatible with the host system interface without having to be modified.

C. Data Structure Differences

WMCLIENT 540 must have knowledge of windows being created destroyed, mapped, or unmapped. This knowledge is necessary because, for example, when a window managed X window is unmapped (i.e., removed from visibility), the frame window must also be unmapped.

In order for WMCLIENT 540 to keep track of windows, certain X system data structures must be modified. FIG. 7 shows an X WindowRec window data structure 700 modified for use in a preferred embodiment of this invention. Portion 710 has identifiers from the standard part of the X Window System. Identifiers 720 and 730 are identifiers added to the set of WindowRec identifiers to implement the preferred embodiment of the present invention. HASBEENMAPPED identifier 720 controls the suppression of PM WM_WINDOWPOSCHANGED and WM_MOVE events which host server 510 may generate prematurely.

hPMWnd identifier 730 is a pointer to a PM window structure corresponding to the X window structure. Because every X window is implemented as a PM window, this pointer allows a translation from X window to corresponding PM window, which is needed for the processing of requests.

In addition the PM window data structures (PMREC) must be modified to contain a pointer to the corresponding X WindowRec data structures. This pointer allows a translation from PM window to the corresponding X window, which is needed for the processing of PM events. Processing PM events by display server 530 may involve the generation of X events.

Figure 8:
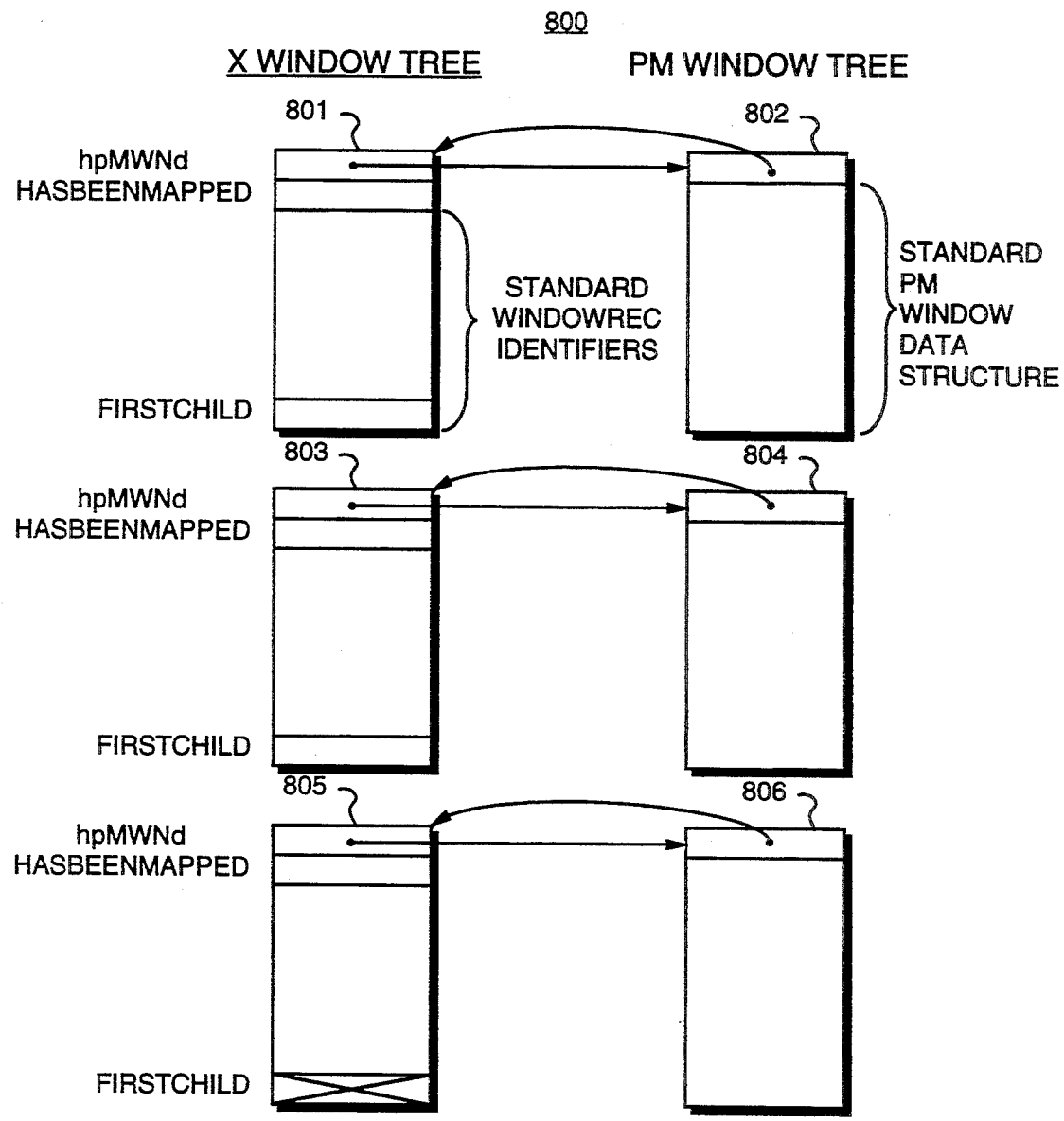
FIG. 8 shows an X window tree using instances of the window data structure shown in FIG. 7.

The various X WindowRec data structures are linked together to form an X window tree which allows display server 530 to find related windows. FIG. 8 shows a diagram mapping X windows represented by X WindowRec data structures 801, 803, 805 into the corresponding PM windows represented by PMREC structures 802, 804, 806. The hPMWnd identifiers in structures 801, 803 and 805 point to corresponding PMRECs 802, 804 and 806, respectively which also point back to the corresponding X WindowRec.

In the preferred embodiment, the correspondence allows X display server 530 to receive a request for an X window and then issue a PM request for the corresponding PM window.

D. Control Flow Differences

Although the virtual window manager WMCLIENT 540 (FIG. 5) appears to be a separate process from display server 530 when viewed outside of display server 530, in the preferred embodiment, display server 530 and WMCLIENT 540 share a common address space within a common process.

Further, to achieve certain efficiencies, the code implementing WMCLIENT 540 is intertwined with the code implementing the other portions of display server 530. In other words, WMCLIENT 540 is a procedure composed of a first set of interrelated computer instructions, and the part of display server 530 responsible for executing the graphics operation request directly is a second procedure composed of a second set of interrelated computer instructions interspersed with the computer instructions of WMCLIENT 540. Because the two sets of computer instructions are interspersed, execution of the two procedures is interleaved.

As described previously, the invention includes the steps of receiving a graphics request from a client, such as X client 533, and submitting the request to an emulated management client, such as WMCLIENT 540. In the preferred embodiment, of the emulated management client, WMCLIENT 540, is implemented with conditional statements dispersed throughout the X window sample server. For example, if the request being processed requires redirection, supplemental calls to request dispatch routines are performed inline. This has the effect of simulating the requests that a window manager would submit in response to receiving a redirected request.

Code to be added to an X window sample server in order to implement WMCLIENT 540 will be discussed. Unless otherwise specified, routine names used in the discussion that follows refer to routines in the X window sample server version 11, Release 4, published by MIT. All OS/2 PM routine names are identified by "PM."

All PM clients require that the entry point be named MAIN. Therefore, one modification to the X window sample server is to rename the entry point named MAIN to be XMAIN, and modify it. A new routine, MAIN, is written to initialize the PM environment, and then MAIN calls XMAIN. This initialization includes a call to PM WinRegisterClass to register a PM window class. This PM call causes extra storage in the PM window data structure (PMREC) to be allocated for the pointer to a corresponding X WindowRec data structure. Because XMAIN may return when server 530 closes down, MAIN closes down the PM environment after the call to XMAIN.

From the viewpoint of clients, the virtual window manager client WMCLIENT 540 must appear to be just another client connected to the server and possessing resources such as windows. To achieve this end, the status of WMCLIENT 540 is represented in display server 530 with many of the same data structures that would be used to represent other X clients. This representation is implemented with steps performed in the initialization section of the sample server where display server 530 allocates data for WMCLIENT 540. The data initialization for WMCLIENT 540 is performed after the "server client," which owns certain resources including the root window, is created and initialized.

The data initialization for WMCLIENT 540 includes allocating a data structure (not shown) for the client and placing the data structure at a predefined position in display server 530's client array. InitClientResources is called for WMCLIENT so that space is allocated in the client resources table for resources such as windows, fonts, pixmaps, and graphics contexts. A client counter (not shown) in Display server 530 is increased by 1 to signify the existence of WMCLIENT 540.

In the routine CreateRootWindow, PM WinCreateWindow is called to create a PM object window, shown as X_ROOT 601 in FIG. 6, which is equivalent to HWS_ROOT 602. (The PM object window is a special PM window, having no parent, that will own the PM frame windows) The display server 530 owned X root window is associated with the PM root window by setting the X WindowRec structure to point to the PM root window: pWin→hPMWnd=HWND_DESKTOP. WMCLIENT 540 makes itself eligible to receive certain events in which a window manager would be intersted, by setting an event mask for the X root window: pWin→eventMask=ResizeRedirectMask|SubstructureRedirectMask. Because only one client can set the ResizeRedirectMask and SubstructuralRedirectMask fields in an event mask for a certain window, WMCLIENT 540's setting these fields in a root window event mask prevents another window manager from providing common management functions for all clients.

2. Request Processing

Figure 9:
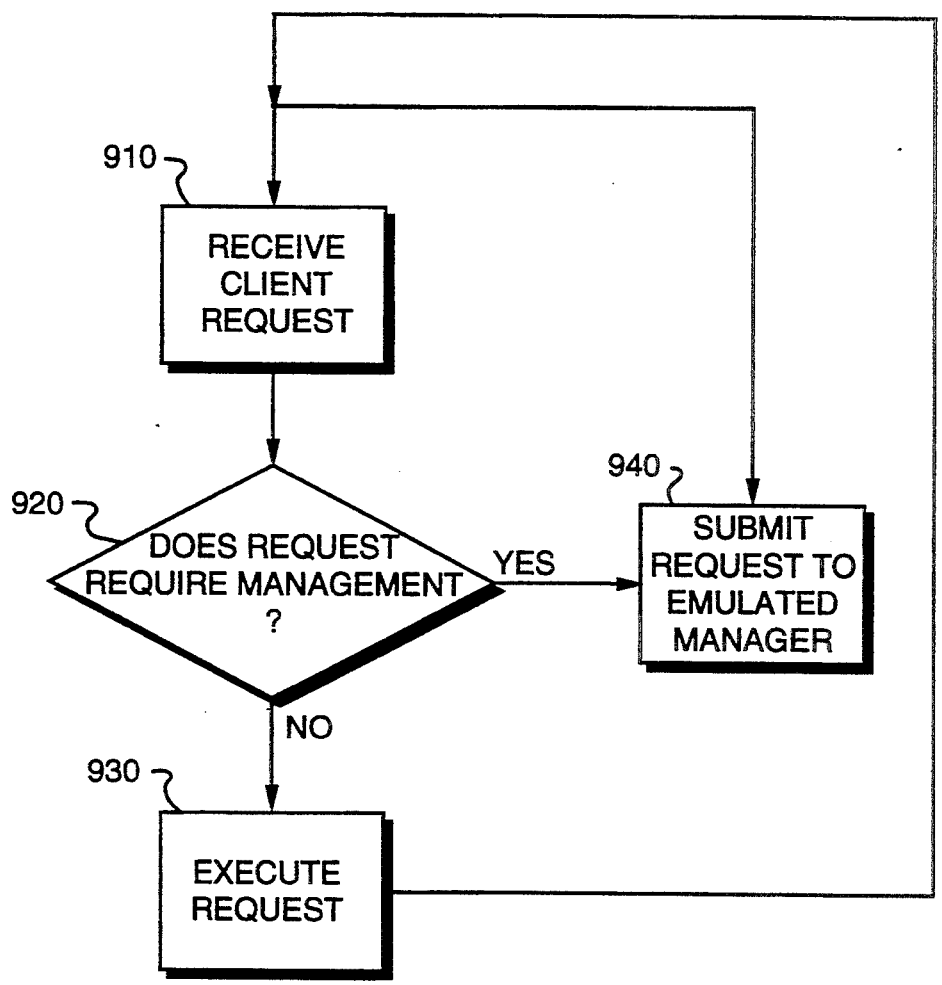
FIG. 9 shows a general control flow diagram for a preferred implementation of a window management method in accordance with a preferred embodiment of the present invention.

FIG. 9 shows a general flow diagram 900 for request processing in the preferred embodiment. First, a request for graphics operation is received by display server 530 from an X client (step 910). Next, display server 530 determines whether the request requires performance of window management functions (step 920). This determination, discussed in greater detail below, generally involves a test of the status of the window to which the request relates. If the request does not require window management functions, then it is executed as dictated by the request (step 930). If the request does require window management functions, the request is submitted to the emulated manager WMCLIENT 540 (step 940). In the preferred embodiment, the step of submitting (step 940) is implemented by following a WMCLIENT 540 execution path, which exists in the same address space as the execution path of the executing step (step 930).

For certain requests, the invention allows for the step of submitting (step 940) to include the substep of executing the request directly, as dictated by the request, before submitting the request to the emulated manager.

Steps 920, 930 and 940 will now be described in greater detail in the discussion of the implementation of specific requests.

Figure 10:
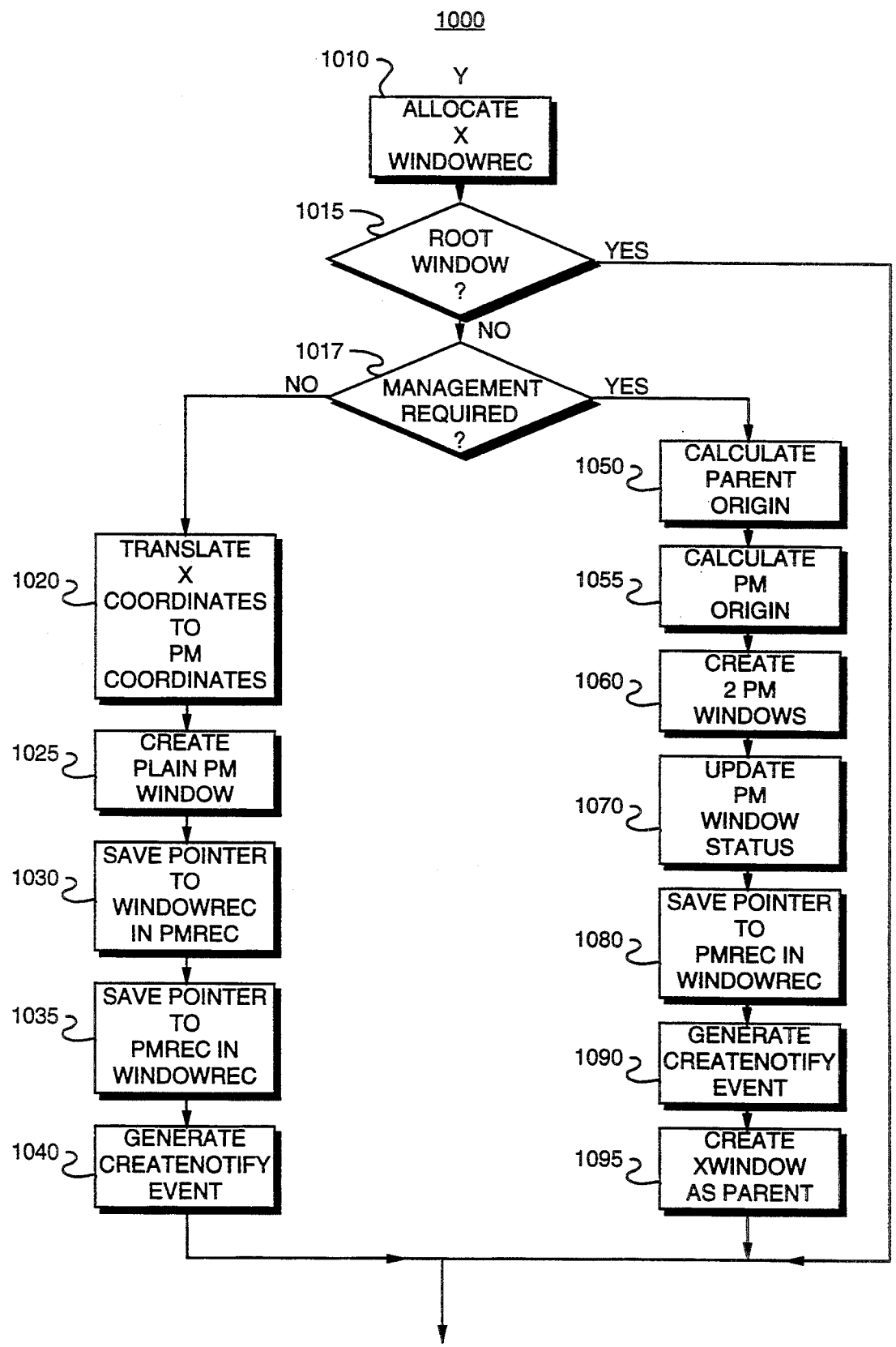
FIG. 10 shows a control flow diagram for a CreateWindow request.

FIG. 10 shows a flow chart 1000 for handling the CreateWindow request. First a new WindowRec structure is allocated for the window to be created (step 1010). If the new window is the root window (step 1015) normal processing is avoided because the X root window has been created and is owned by the server client.

Next a determination is made to see whether management functions are required (step 1017). This is essentially the determination made in step 920 of FIG. 9. In order to determine whether the request requires window management, a check is performed to see whether the window is to be created as child of root window and without the override-redirect attribute. If both conditions are true, the CreateWindow request is for a window to be managed. If either condition is false, the request is treated as if it were for a nonmanaged window, as in step 930 in FIG. 9.

The first step in responding to a request from a nonmanaged window involves translating the coordinates of the window to be created from X coordinates to PM coordinates (step 1020). This translation is necessary because in the X Window System the origin of a window is the upper lefthand corner, while in the PM window system the origin of a window is the lower lefthand corner. Next, a PM window without user interface objects (PMREC) is created (step 1025). A pointer to an X WindowRec is then saved in the PMREC just created (step 1030), and a pointer to the PMREC is saved in the X WindowRec (step 1035), thus creating an addition to an X window tree, such as the one shown in FIG. 8. Finally, a CreateNotify event is generated to inform clients of the creation of a new window (step 1040).

If the CreateWindow request does require window management function (step 1017), the rightmost branch of the flowchart 1000 beginning with step 1050 is followed. Steps 1050-1095 correspond to the emulation of a window manager inside of the display server and receiving windowing requests from the emulated manager as in step 940 of FIG. 9.

The emulation begins with the calculation of an X window origin to the WMCLIENT 540 parent of the requested window to be created. This calculation is based on the requested window's width, height, and border size (step 1050). It also involves translation of X coordinates to PM coordinates. Next, the origin of the PM frame window relative to the PM root window is calculated such that all, or as much as possible, of the PM frame window is visible on the screen (step 1055). Next, both the requested and the PM frame windows are created (step 1060). Preferably this window creation uses a call to PM WinCreateStdWindow to create a frame window using a style that includes a title bar, system menu, size border, and the minimum and maximum control features.

After the call to WinCreateStdWindow, the status of the newly created requested and frame windows is updated (step 1070). This preferably involves four calls to PM routines. The first is a call to PM WinSetWindowULong to save a pointer to the newly allocated WindowRec structure of the requested window in PM window structure. Next a call to WinSetWindowPos is made to set the position and size of the frame window. Then a call is made to PM WinSetOwner to set the owner of the frame window to be the PM object window X_ROOT 601, described earlier. Finally, a call is made to PM WinSetOwner to set the owner of the requested window newly created to be the frame window newly created.

After updating the window status, the hPMWnd field of the WindowRec data structure of the requested window is set to point to the new PMREC (step 1080). This is done so that X display server 530 and WMCLIENT 540 can process subsequent requests for the new X window by processing the corresponding PM window.

Next, a CreateNotify event is generated (step 1090), as required by the X protocol. Finally, an X window corresponding to the newly-created PM frame window is created as a parent of the newly created X window (step 1095). This completes the management of the CreateWindow request performed by WMCLIENT 540.

Figure 11:
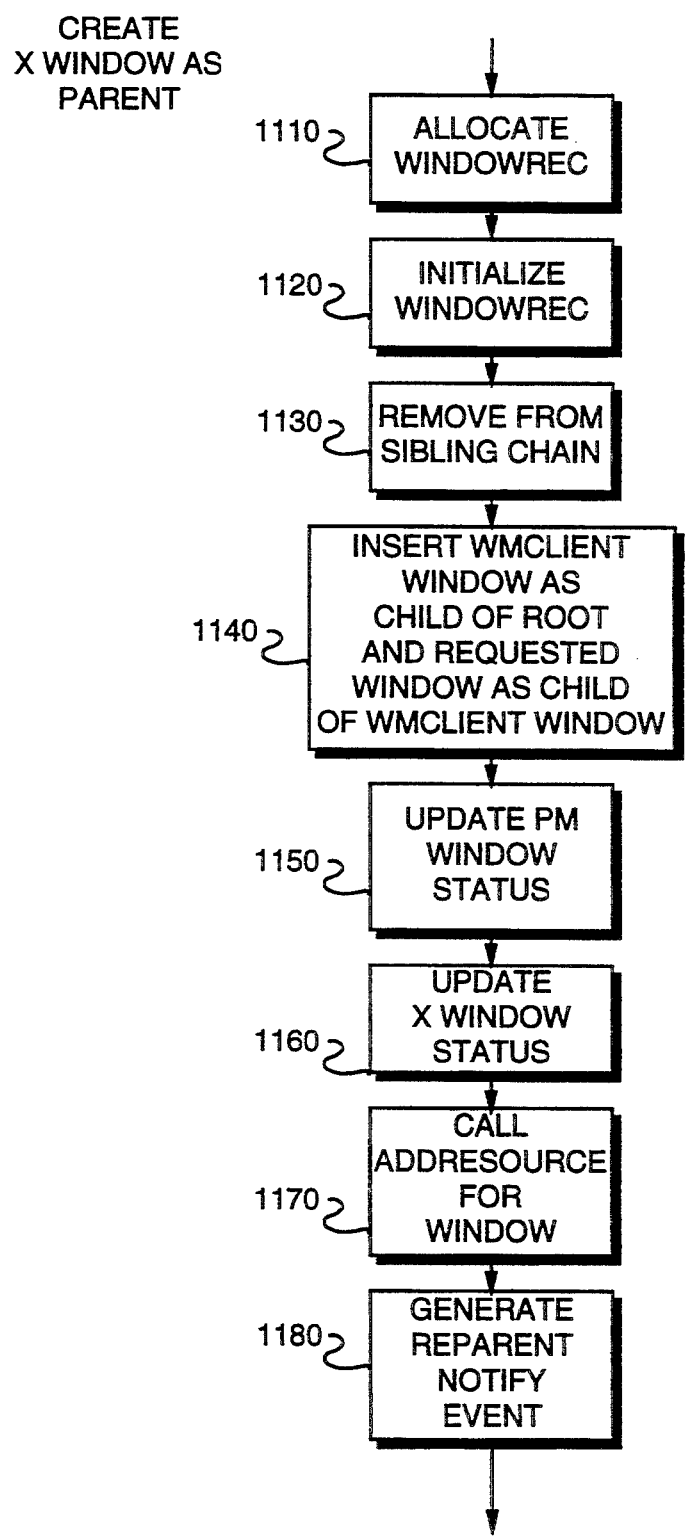
FIG. 11 shows some substeps of the control flow outlined in FIG. 9.

FIG. 11 shows a flow diagram 1100 to explain a preferred method for creating the X window as a parent (step 1095). To create an X window as parent, first a new X WindowRec data structure is allocated for the PM frame window just created (step 1110).

The X WindowRec structure is then initialized (step 1120). This is preferably accomplished in two steps. First, a client part of the ID field of the DrawableRec structure, shown in portion 710 (FIG. 7), is set to "1" to indicate that WMCLIENT 540 is the owner of the window. Then the X WindowRec parent field is set to indicate that the root window is the parent.

The requested window is then removed from its sibling chain (step 1130) because the requested window will no longer be a sibling to the child of root windows after the reparenting.

Next, the X window just created, owned by WMCLIENT 540 and corresponding to the new PM frame window, is inserted as a child of the X root window. This new X window is placed at the top of the stacking order of the children of the root window, and the requested window is inserted as child of the WMCLIENT 540 owned X window ( step 1140 ).

The PM window status is then updated (step 1150). This is preferably accomplished by calling PM WinSetWindowULong to save the pointer to the WMCLIENT X WindowRec structure in a PMREC.

Following the PM window adjustment, the X WindowRec structure is updated (step 1160). In the preferred embodiment, this is done by setting the hPMWnd field of the X WindowRec structure with the pointer to the PMREC for the frame window.

Next, a routine AddResource is invoked for the newly-created window, so that the window will be recorded as a system resource (step 1170). Finally, a ReparentNotify event is generated for the window as required by the X protocol (step 1180).

Figure 12:
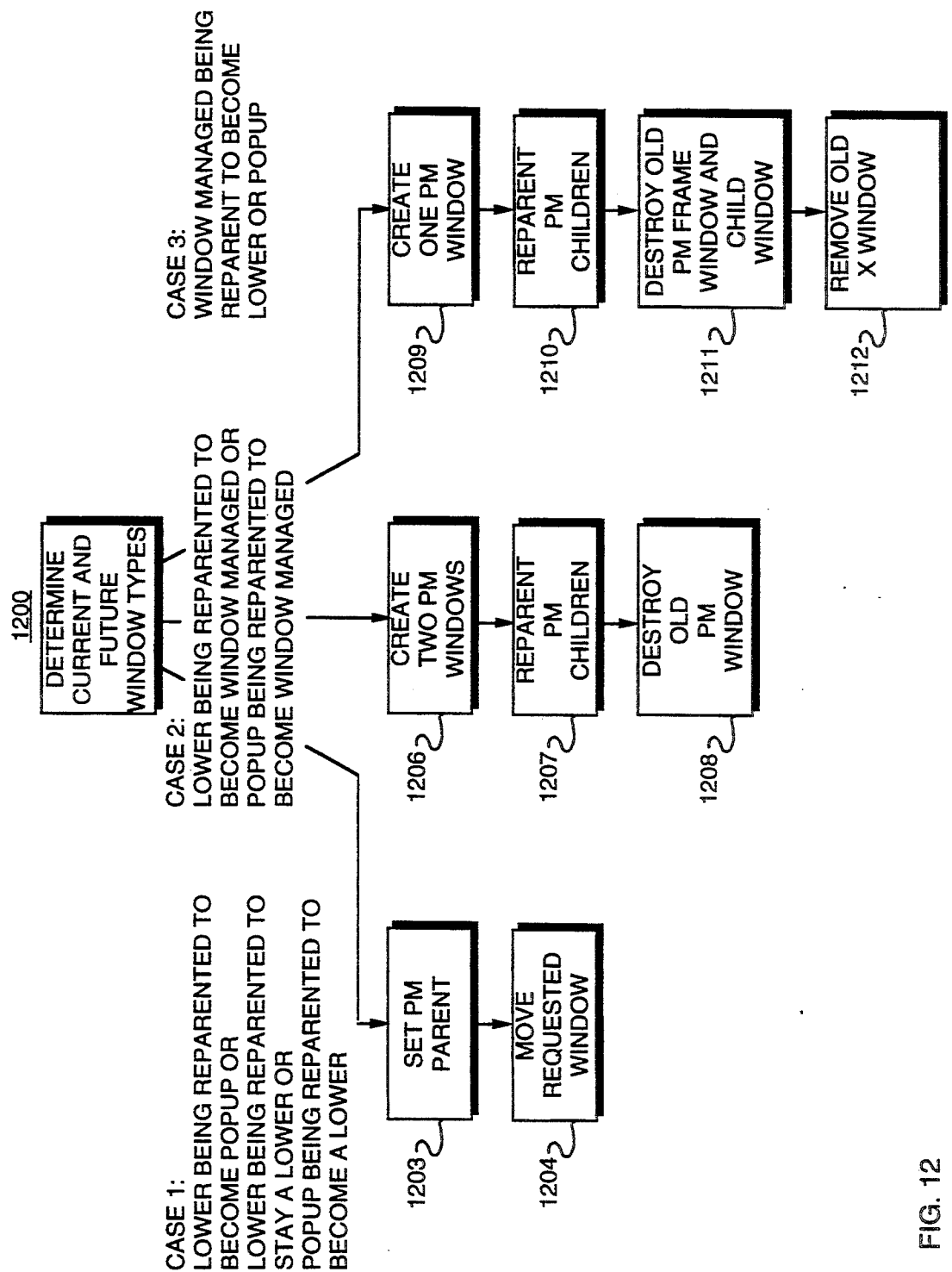
FIG. 12 shows a control flow diagram for changes to ReparentWindow request processing.

A ReparentNotify event is also generated by the ReparentWindow request. A ReparentWindow request may involve a change in the window management status of the requested window, causing an unmanaged window to become managed or a managed windoH to become unmanaged. FIG. 12 includes a flow diagram 1200 of a procedure to make additions needed to the routine ReparentWindow. The standard sample server code that makes the requested window a child of the parent specified in the ReparentWindow request is not shown.

For purposes of ReparentWindow request processing, a window is one of three types: 1) POPUP, meaning that the window has the override-redirect attribute and is child of the root; 2) WINDOWMANAGED, meaning that the requested window presently has a WMCLIENT owned frame window as its parent; and 3) LOWER, meaning the requested window is neither the child of the root window nor a child of a WMCLIENT window.

First, the current type of the requested window is determined, as is the future type of the window after reparenting (1201). The results of these determinations can be classified into one of three cases. Case 1 shown in FIG. 12 occurs when a LOWER is reparented to be a POPUP, a LOWER is reparented to stay a LOWER or a POPUP is reparented to become a LOWER. Each of these indicates that there is no change in window management status. The new PM parent is set by calling PM WinSetParent (step 1203). Finally, the newly reparented window is moved to the position, relative to the parent origin, specified in the ReparentWindow request (step 1204).

Case 2 shown in FIG. 12 occurs when a LOWER or POPUP is reparented to be WINDOWMANAGED, and indicates a change to the window management status of the requested window, as the requested window is changed from being a nonmanaged (LOWER or POPUP) window to a managed (WINDOWMANAGED) window. Thus steps 1206–1208 in FIG. 12 involve converting a PM nonmanaged window to a PM managed window having a PM frame window.

First, a pair of PM windows corresponding to the requested window and a frame window is created (step 1206) with processing similar to PM CREATEWINDOW, whose control flow was outlined in FIG. 10. WMCLIENT 540 will own the newly-created PM frame window, and the newly-created PM window of the requested window will replace the old PM window of the requested window specified in the reparent window request.

Children of the old requested PM window are then reparented to the newly-created PM window (step 1207), and the old requested PM window is then destroyed (step 1208). PM data for the old requested window need not be transferred to the newly-created requested window, since in the preferred embodiment, display server 530 does not store window pixel data in a backing store.

The conditions for case 3 shown in FIG. 12 are the inverse of case 2. Case 3 also indicates a change in window management status but occurs when a WINDOWMANAGED window is being reparented to be a LOWER or POPUP. The status of the requested window is being changed from window managed (WINDOWMANAGED) to nonwindow managed (LOWER or POPUP). The processing is similar to case 2.

First, a single PM window is created with processing similar to PM CREATEWINDOW shown in FIG. 10 (step 1209). Children of the old requested PM windows are then reparented to the new requested window (step 1210). The old PM frame window and old requested PM window are destroyed by a call to PM WinDestroyWindow (step 1211). Finally, the old X frame window is removed from the resource list with a call to FreeResource (step 1212).

Figure 13:
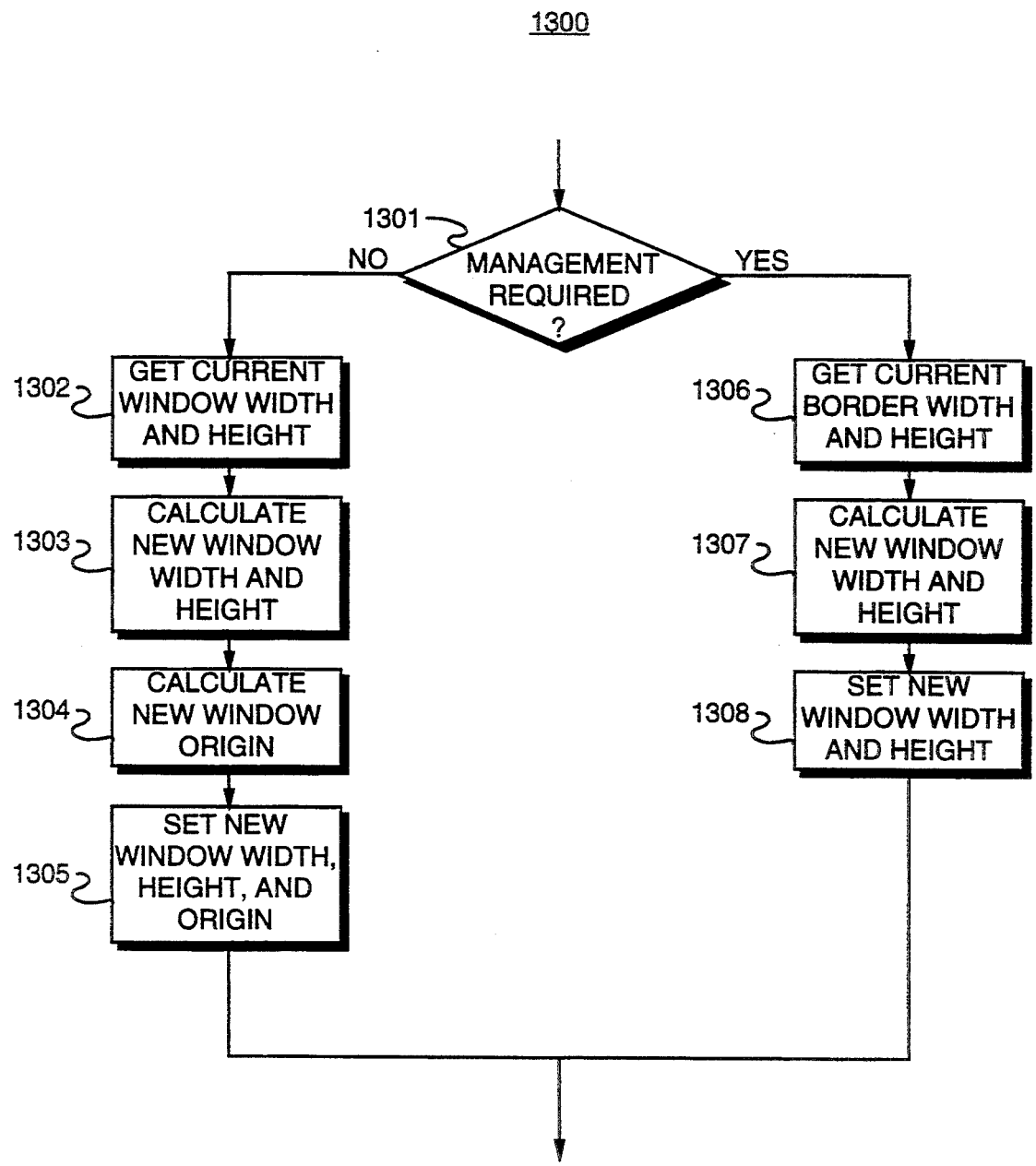
FIG. 13 shows a control flow diagram for a ChangeBorderWindow routine in a ConfigureWindow request.
Figure 14:
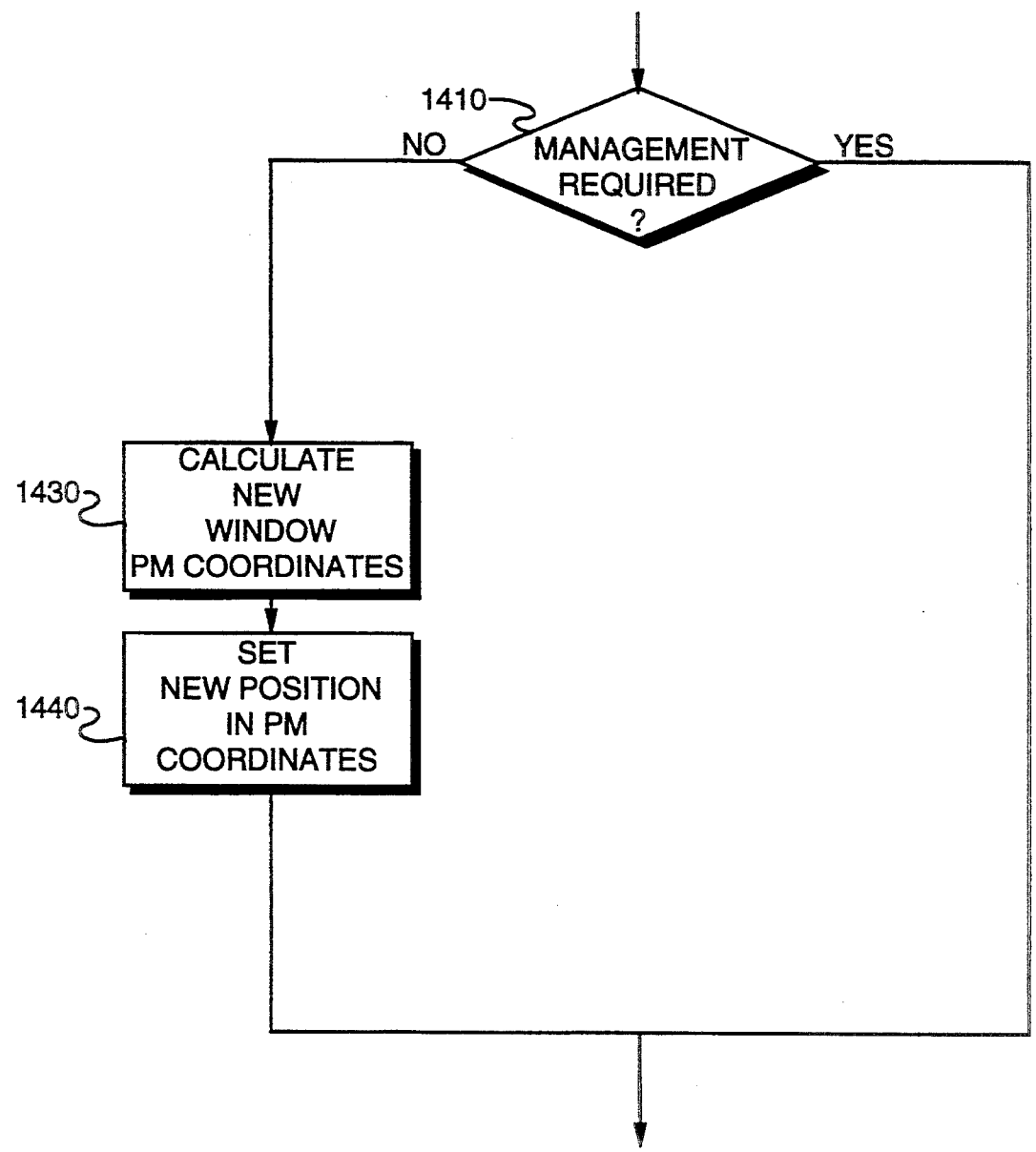
FIG. 14 shows a control flow diagram for changes to the routine MoveWindow for the ConfigureWindow request.

FIG. 13 and 14 shows additions needed to two routines for WMCLIENT 540 in the ConfigureWindow request code.

In one routine, ChangeBorderWidth, processing must be performed to account for the fact that, in the X Window System, a window has two origins. The first origin is used to measure a window position relative to its parent and is located on the outside upper left hand corner of the window border. The second origin is for drawing and it is located on the inside upper left hand corner of the window border. In PM coordinates, the width and height of a window grow by twice the change in border width.

Flow diagram 1300 in FIG. 13 explains the change required. First, it must be determined whether the requested window requires window management functions (step 1301). This is preferably done by testing whether the parent is owned by WMCLIENT.

If the request does not require management, PM WinQueryWindowPos is called to get the current window width and height (step 1302). A new window width and height are calculated based on the current requested border widths (step 1303), and a new window origin is calculated (step 1304). The calculation of a new PM origin is required, even though the X window origin did not change, because of the upper lefthand corner location of an X window origin being different than the lower lefthand corner location of a PM window origin, as explained earlier. Finally, the new window height, width, and origin are set with a call to PM WinSetWindowPos (step 1305). This call to PM WinSet- WindowPos performed for step 1305 will generate a PM WM_MOVE event, as well as a PM WMW_INDOWPOSCHANGED event, because in step 1305 the window moves relative to the parent and changes size.

If the request does require window management functions (step 1301) PM WinQueryWindowPos is called to get the current width and height (step 1306). A new width and height are calculated (step 1307), but a new origin is not calculated. A new origin is not calculated because the requested window will not move relative to the parent, which is the frame window. Finally, a new width and height are set with a call to PM WinSetWindowPos, which will generate the PM WM_WINDOWPOSCHANGED event (step 1308).

FIG. 14 contains flow diagram 1400 to illustrate the change to the routine MoveWindow, which will be called if the ConfigureWindow request is moving a window relative to its parent. The added steps are performed to prevent clients from moving a frame window owned by WMCLIENT 540. Thus, in the preferred embodiment, managed windows can only be moved from the PM side via the PM user interface objects.

In flow diagram 1400 first it is determined whether the requested window requires window management functions by testing whether the parent window is a WMCLIENT owned frame window (step 1410).

The new PM window position is then calculated (step 1430). Finally, PM WinSetWindowPos is called to set the new PM position (step 1440).

MapWindow request processing has code in the routine MAPWINDOW to set the HASBEENMAPPED field of the X WindowRec structure, shown as 720 in FIG. 7, to true. This is done so that PM WM_MOVE and WM_WINDOWPOSCHANGE events can be discarded until the window has been mapped at least once.

MapWindow request processing has code to handle the case where a ChangeWindowAttributes request has changed the window management status of the requested window by adding or deleting the override-redirect attribute on the window. There will be a change in window management status if a child of a WMCLIENT-owned window has the override-redirect attribute, in which case the window should go from a managed state to a non managed state; or if a child of the root window does not have the override-redirect attribute, in which case the window should go from a nonmanaged state to a managed state. If either of these two cases occur, a routine similar to ReparentWindow is called with parameters to indicate that the root window is the new parent.

The MapWindow request has code in the routine pmMapWindow to map the PM frame window, if the window being mapped is window managed, rather than the PM window corresponding to the requested window. Mapping the PM frame window will map both the WMCLIENT 540-owned frame and the requested window, and will generate a MapNotify event for each of the WMCLIENT 540-owned frame and the requested window.

The UnmapWindow request has code in the routine pmUnmapWindow to unmap the PM frame window, if the window being unmapped is window managed, rather than the PM window corresponding to the requested window. Code additions for window unmap processing does not include setting the HASBEENMAPPED field to false, as that field indicates whether the window has been mapped at least once. Unmapping the PM frame window will unmap both the WMCLIENT 540-owned frame and the requested window, and will generate an UnmapNotify event of the WMCLIENT 540-owned frame and the requested window.

In processing the DestroyWindow request, a check is performed to determine if the window being destroyed has a WMCLIENT-owned window as parent. If so, a call to FreeResource is performed for the WMCLIENT-owned X window. Further, if a window-managed window is being destroyed, then a call to the PM routine WinDestroyWindow is performed for the PM frame window instead of the requested window. The call to PM DESTROYWINDOW in this case will destroy both the frame window and the requested window. If the window being destroyed does not have a WMCLIENTowned window as parent, the requested window is destroyed.

In the X Window System, each window may have a number of named "properties," which are collections of data. A suggested feature, though not completely implemented in the preferred embodiment, involves the processing of properties in the routines ProcChangeProperty and ProcRotateProperties. If certain properties (such as WM_NAME, WM_ICON_NAME, WM_NORMALHINTS, WM_HINTS and WM_TRANSIENT_FOR) change because of a request, certain PM routines would be called as a result. For example, if the WM_NAME property were to change and the requested window were being displayed, PM WinSetWindowText would be called to change the name in the requested window's title bar. Another example would be when the icon_pixmap (a pixmap for a compact representation of a window, called an "icon"), which is a subcomponent of the WM_HINTS property, were to change and the requested window were to be in an iconic state, PM routines would be called to draw the new pixmap into the iconified window.

3. Processing Outgoing X Events

In the X Window System, the X display server informs clients of the status of a window by sending X events. Normally, a window manager would be eligible to receive X events, as a window manager is just another client. In the preferred embodiment, however, X events that would normally be sent to a window manager client are not sent to the window manager client EMCLIENT 540 because WMCLIENT 540 does not set any event masks. Instead, display server 530 contains WMCLIENT 540 X event processing code at places where the events are generated in display server 530.

4. Processing Incoming PM Events

Figure 15:
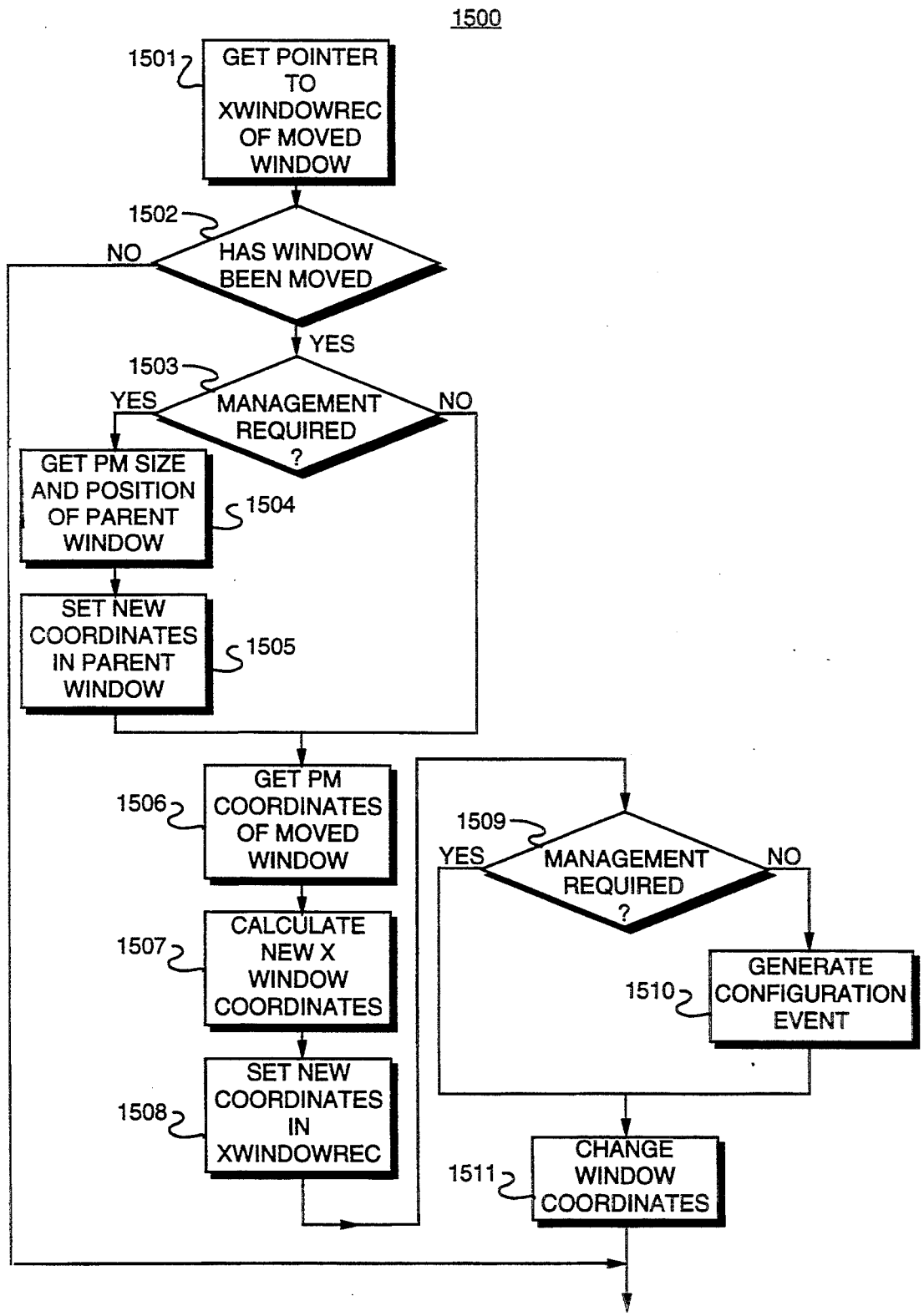
FIG. 15 shows a control flow diagram for a PMWM_MOVEWINDOW event.

In the PM system, the PM server informs PM clients of the status of a window by sending PM events. In the preferred embodiment, X display server 530, being a PM client, receives PM events from host server 510. FIG. 15 shows a control flow diagram 1500 for processing the PMWM_MOVE event received from host server 510.

There are at least two ways to receive the PMWM_MOVE event. The first way is that the user moves the window using one of the PM user interface objects. The second way is for a client, such as X client 533 connected to display server 530, to move, resize, or change the border width on the window with a ConfigureWindow request, which causes display server 530 to send a PM request to host server 510. This will in turn cause the host server 510 to issue a PM WM_MOVE event.

FIG. 15 shows a control flow diagram 1500 for the routine HandlePMMoveMessage. PM WinQueryWindowULong first is called to get a pointer to the X WindowRec structure of the moved window (step 1501). Second, it is determined whether the moved window has been mapped by testing the HASBEENMAPPED field, shown at 720 in FIG. 7 (step 1502).

If the window has never been mapped, normal processing is bypassed, as the PMWM_MOVE event will contain meaningless data. If the window has been mapped, it is determined whether the moved window requires window management functions (step 1503). This is done by determining whether the window has a WMCLIENT 540 owned window as its parent.

If the window is being managed, WinQueryWindowPos is called to get the frame window's size and position (step 1504), and new X window coordinates are calculated and set in the frame window's X WindowRec (step 1505). The coordinates, called drawable.x, drawable.y, origin.x, origin.y, are set in portion 710 of the X WindowRec structure 700 (FIG. 7) of the parent window.

The remaining processing is performed regardless of whether the moved window requires management. This processing includes calling PM WinQueryWindowPos to get the PM coordinates for the moved window (step 1506). New coordinates for the X window are calculated (step 1507), and the new coordinates are set in the X WindowRec structure 700 (step 1508).

Next, it is again determined whether the window requires window management functions by checking whether the window has a WMCLIENT-owned window as parent (step 1509). If the window is not window-managed, a ConfigureNotify X event is generated for the window (step 1510). The ConfigureNotify X event is suppressed if the window has a WMCLIENT 540-owned window as parent because the processing of steps 1504 and 1505 ensures that the moved window will not move relative to its parent (the WMCLIENT frame window).

Finally, ResizeChildrenWinSize is called with the change in the coordinates origin.x and origin.y for the window so the relative drawable positions of the window's children can be updated (step 1511).

Processing for the PM WM_WINDOWPOSCHANGE event is similar to processing for the PM_WMMOVE event outlined in FIG. 15. One difference is that the steps of setting new coordinates (steps 1505 and 1508) also includes the steps of setting the width and height parameters for the window called drawable.width and drawable.height in portion 710 portion of the X WindowRec structure 700 (FIG. 7). Another difference is that the ConfigureNotify event (step 1510) is generated regardless of whether the moved window is managed, because the WM_WINDOWPOSCHANGE message may change the size of the window regardless of whether the window is window managed.

Figure 16:
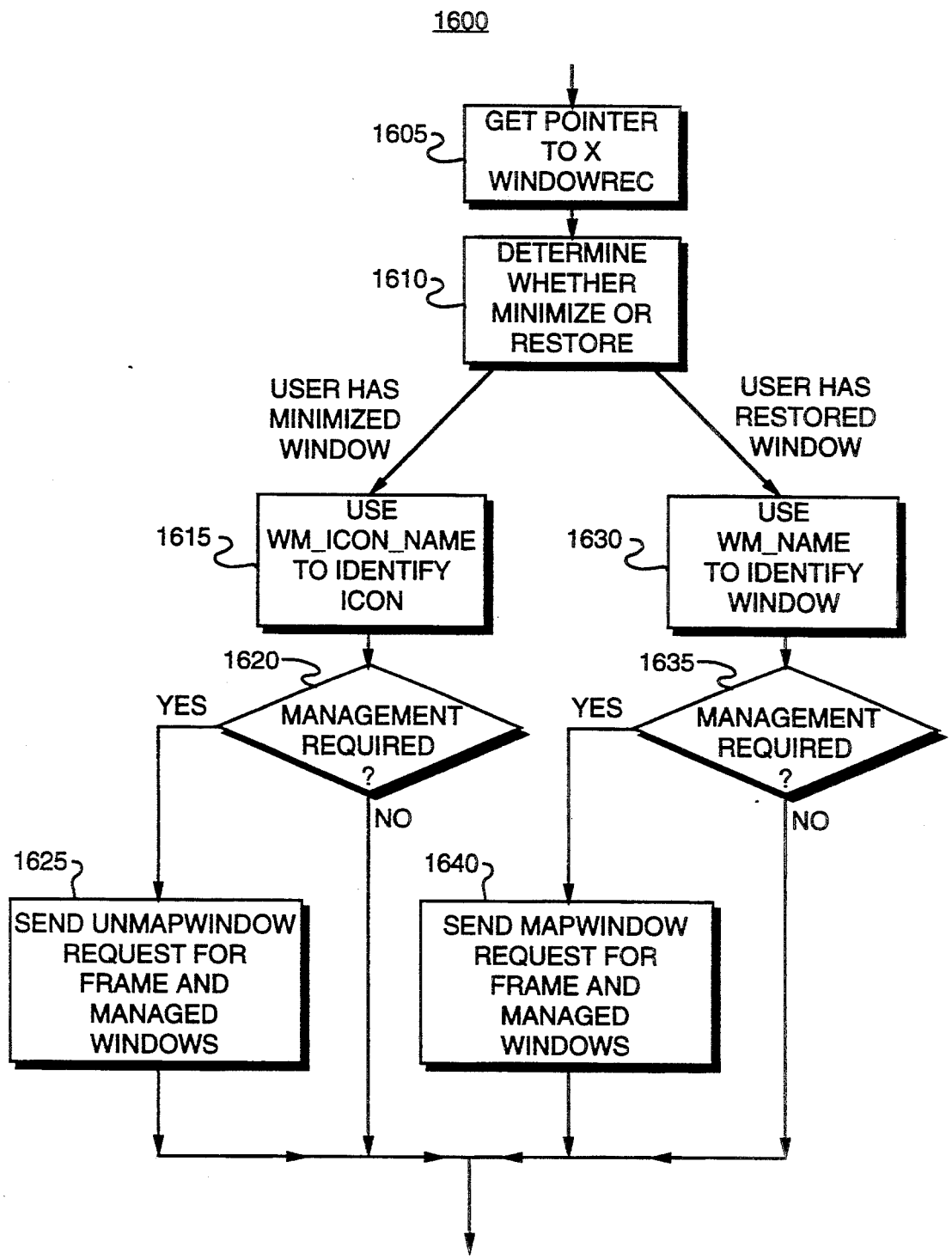
FIG. 16 shows a control flow diagram for a PMWM_MINMAXFRAME event.

The PM user interface objects allow the user to "minimize" a window, causing the window to be displayed in a compact form called an "icon", or "restore" a window, causing the window to be displayed in the normal manner. FIG. 16 outlines processing for the PM WM_MINMAXFRAME event, which is generated when the user minimizes or restores a window. First, PM WinQueryWindowULong is called to get a pointer to the X WindowRec structure of the affected window (step 1605). It is determined whether the user has minimized or restored the window (step 1610). Processing of the PM WM_MINMAXFRAME event involves calling PM WinSetWindowText using conventional X properties. Thus, if the user has minimized the window, the WM_ICON_NAME property, if defined, is used to call WinSetwindowText to set the window icon name field (step 1615). (A suggested feature, though not implemented in the preferred embodiment, is to read the WM_HINTS property and to draw the icon pixmap into the minimized window, provided the property icon_pixmap in WM_HINTS is defined.) The X WindowRec structure is checked to determine whether WMCLIENT 540 is the owner of the indicated window, meaning that management is required (step 1620). If management is required, WMCLIENT 540 sends an UnmapWindow request for the managed window and the frame window to display server 530, thereby causing display server 530 to generate an UnmapNotify event for each window.

If the user has restored the window, the WM_NAME property, if defined, is used to call WinSetWindowText to set the name in the window's title bar (step 1630). The X WindowRec structure is checked to determine whether WMCLIENT 540 is the owner of the indicated window, meaning that management is required (step 1635). If management is required, WMCLIENT 540 sends an MapWindow request for the managed window and the frame window to display server 530, thereby causing display server 530 to generate an MapNotify event for the window (step 1640).

The PM WM_SETFOCUS signifies a change in "input focus," meaning that a window is either acquiring or losing eligibility to receive keyboard input. The PM WM_SETFOCUS event can originate either from PM, after the user changes the input focus with one of the user interface objects, or from an X client after an X client generates a SetInputFocus request.

Figure 17:
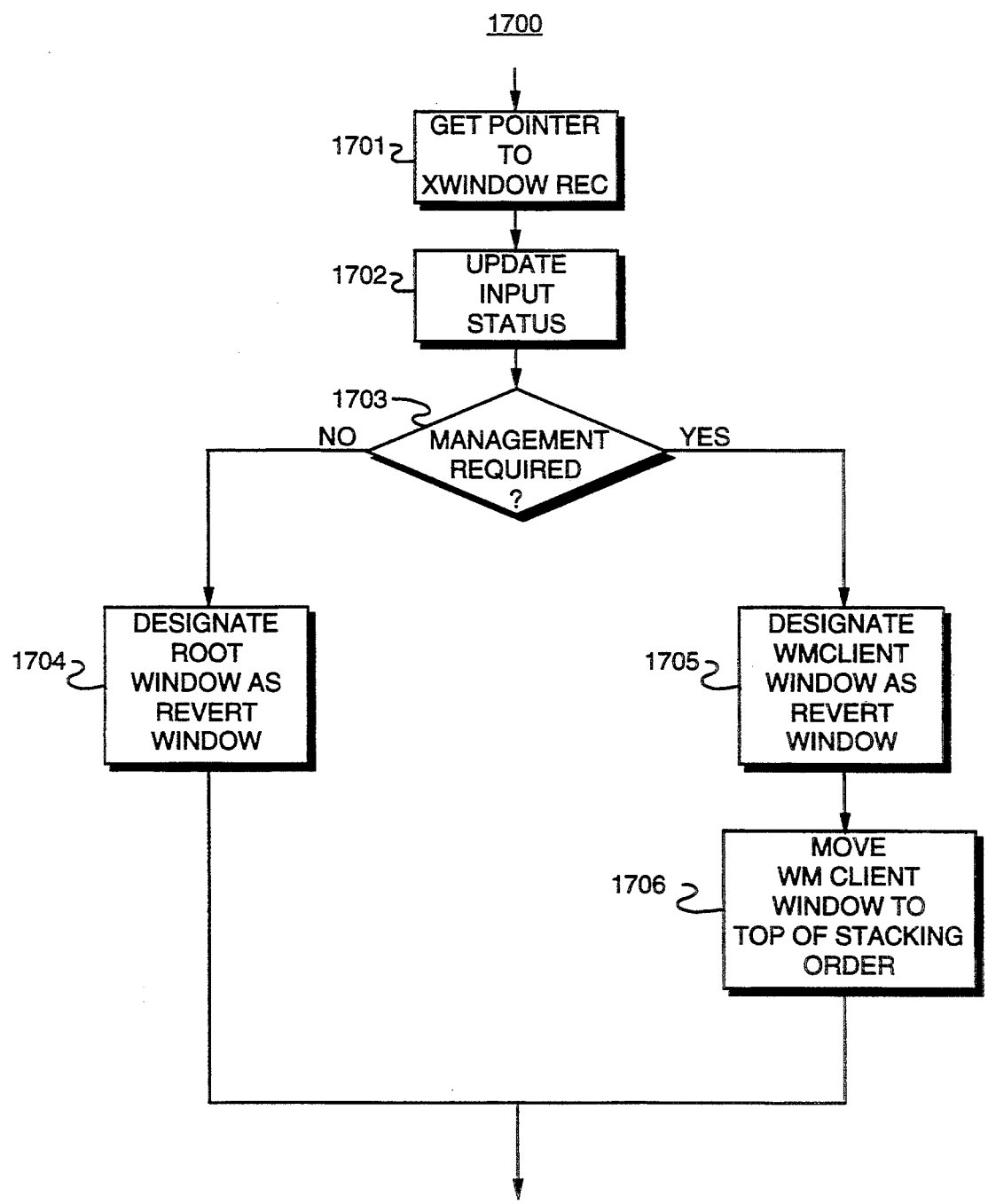
FIG. 17 shows a control flow diagram for a PMWM_SETFOCUS event.

FIG. 17 contains a control flow diagram 1700 setting forth processing added to the routine DoFocusChange. First, a pointer to the X WINDOWREC for the X window corresponding to the PM window designated in the PM WM_SETFOCUS event is obtained by calling PM WinQueryWindowULong (step 1701).

Next, data bases are updated to reflect the change in input focus by calling DoFocusEvents to designate that the X window is gaining keyboard input focus and that no window is losing keyboard input focus, or that the X window is losing keyboard input focus and that no window is gaining keyboard input focus, depending on whether the WM_SETFOCUS event designates that the X window is gaining focus (step 1702).

It is then determined whether management functions are required by checking whether the X window has a WMCLIENT-owned window as parent (step 1703). If management functions are not required, the root window X_ROOT 601 (FIG. 6) is designated as the window for which input events are generated if no client solicits input events for the X window (step 1704). This designation is effected by setting the FocusClassRec data structure: focus→revert=RevertToPointerRoot.

If the window does require window management functions, then the WMCLIENT 540-owned window parent is designated as the window for which input events are generated if no client solicits input events for the X window (step 1705). This designation is effected by setting the FocusClassRec data structure: focus→revert=RevertToParent. The WMCLIENT 540-owned window is moved to the top of the stacking order by calling the sample server routines MoveWindowInStack and WindowsRestructured (step 1706).

D. CONCLUSION

With the X display server window manager client according to the preferred embodiment, a server is provided which can be implemented using the support technology of an existing server. Clients of the two servers can access the same graphics hardware while presenting a uniform user interface. Remote X Window Systems need not have knowledge of the type of host system in order to start a compatible manager.

Additional advantages and modifications will readily occur to those skilled in the art. The invention in its broader aspects is therefore not limited to the specific details, representative apparatus, and illustrative examples shown and described. Accordingly, departures may be made from such details without departing from the spirit or the scope of applicant's general inventive concept.

For example, there are alternative ways to implement the submitting step and the emulating step. One way would be to take advantage of the fact that the sample server executes one request at a time, and uses events to redirect requests to a window manager client. Instead of dispersing WMCLIENT 540 throughout the server, WMCLIENT 540 could be made more modular. After a display server 530 receives a request from a user client, if the request is to be redirected to the window manager then display server 530 generates an appropriate event, thereby informing WMCLIENT 540 of the request.

The WMCLIENT 540 event handling procedure, in emulating a window manager's handling of an event, may submit its own requests to display server 530 by calling the appropriate display server 530 request processing routine directly. However, some conditional statements that change the execution flow when the current request is from WMCLIENT 540 could be dispersed throughout the server. This would be needed because there are various places in the server where responding to a request as if it had come from a normal client would be appropriate.

Thus, WMCLIENT 540 could Be a procedure composed of a set of interrelated computer instructions organized as a callable module, and the part of display server 530 responsible for executing request directly could be a different procedure. In such a design, it follows that the emulation of the mangement client by WMCLIENT 540 is performed at a different time than the execution of the functions in the graphics operation request directly.

Further, the window manager need not reside in the same address space as the server and may instead be a separate process. Another possibility is that the window manager could be some arbitrary structure, not necessarily code. Instead, management functions could be performed by a data base or lookup table.

In addition, although in the preferred embodiment the display server sends requests to the host server to communicate with the display, in an alternative implementation the display server could communicate with the hardware more directly and the host server could communicate with the hardware by sending requests to the display server. Another possibility is that the display server could have a common interface to the hardware along with the host server.

What is claimed is:

1. A method for providing a uniform windowing interface comprising the steps, performed by a display server, of:
    emulating in the display server a management client that provides graphics management functions for a plurality of clients, the management client emulating step including the substep of
    recording, in a data structure of said display server, information identifying that the management client is in existence;
    receiving a request for a graphics operation from one of said plurality of clients, said graphics operation request having a first format suitable for use by said display server;
    determining whether the graphics operation request requires performance of window management functions;
    submitting the graphics operation request to the management client if the graphics operation request requires performance of window management functions;
    translating by said management client, the graphics operation request requiring performance of window management functions into a set of graphics operation requests having a second format suitable for use by a second, different display server; and
    executing functions in the graphics operation request directly that do not require window management functions.

2. A method according to claim 1,
    wherein the step of emulating the management client includes the substep of
    generating a user interface for a display, said user interface providing a appearance and control functions for each of the clients.

3. A method according to claim 2, wherein the method further includes the step of
    sending messages from the display server to the second server to communicate with the display.

4. A method according to claim 3, wherein the second server sends messages to the display server, and the second server includes an interface having user interface objects,
    wherein the substep of generating the user interface includes the substep of
    receiving a message from the second server when a user selects one of the user interface objects.

5. A method according to claim 2, wherein the method further includes the step of
    sending messages from the display server to an interface to the display.

6. A method according to claim 1, wherein the graphics operation requests includes requests to create a window,
    wherein the step of executing includes the substep of
    processing a request to create window by sending a message to the second server to create at least one window.

7. A method according to claim 1, wherein the method further includes the steps of
    receiving a message from the second server;
    translating the received message into a set of display server messages;
    determining a corresponding set of clients to receive the set of display server messages; and
    submitting the set of display server messages to the corresponding set of clients.

8. A method according to claim 7, wherein the step of submitting the graphics operation request to the management client includes the substeps of translating a selected one of the display server messages in the set of display server messages received from the display server into a set of messages;

determining a corresponding set of the clients to receive the set of message; and submitting the set of messages to the corresponding set of clients.

9. A method according to claim 7, wherein the substep of submitting the set of display server messages to the corresponding set of clients includes the substep of determining whether one of the clients in the set of clients is the emulated management client; and executing a set of computer instructions to emulate the management client if one of the clients in the set of clients is the emulated management client.

10. A computer system comprising:

a display;

client processor means for executing clients; and server processor means, coupled to the display and to the client processor means, for responding to graphics operation requests generated by said clients, said graphics operations requests having a format suitable for use by said server processor means, the server processor means including means for emulating a management client that provides graphics management functions for the clients, a data structure for recording information identifying that a plurality of clients including the management client are in existence, means for receiving the graphics operation requests from the clients, means, coupled to the receiving means, for determining whether the graphics operation requests for graphics operations requires window management, means, coupled to the receiving means and to the determining means, for directly executing the graphics operation requests which do not require window management, means, coupled to the receiving means and to the determining means, for submitting to the emulated management client the graphics operation requests that do require window management, and means, coupled to said emulated management client, for translating said graphics operation requests that do require window management into corresponding sets of graphics requests having a second format suitable for use with a second, different server processor means.

11. A system according to claim 10, wherein the emulated management client includes means for submitting the corresponding sets of graphics requests to the server processor means.

12. A system according to claim 11, wherein the means for emulating the management client includes:

means for generating a user interface on the display, said user interface providing a uniform appearance and control functions for each of the clients.

13. A system according to claim 12, further comprising another server, coupled to the server processor means and the display, wherein said other server includes means for processing said graphic operation requests having said second format, and wherein the server processor means includes means for sending messages to the other server to communicate with the display.

14. A system according to claim 13, wherein the other server includes means for providing window management functions.

15. A system according to claim 14, wherein the other server includes means for sending messages to the display server; and means for generating user interface objects for manipulating window status, wherein the means for generating the user interface includes means for receiving a message from the other server when a user manipulates one of the user interface objects.

16. A system according to claim 13, wherein requests for graphics operations generated by clients include requests to create a window, and the other server includes means for creating windows that may appear on the display, wherein the means for generating the user interface includes means for responding to a request to create a window by sending a message to the other server to create a window.

17. A system according to claim 12, further comprising another server for generating a user interface, the other server including means for sending requests to the server processor means to communicate with the display.

18. A system according to claim 12, further comprising an interface to the display; and another server including means for sending messages to the interface to the display, and wherein the server processor means includes means for sending messages to the interface to the display.

19. A system according to claim 10, wherein the means for emulating includes a first set of computer instructions in a first address space; and wherein the means for executing the graphics operation request directly includes a second set of computer instructions in the first address space.

20. A system according to claim 10, wherein the means for emulating the management client includes a first set of computer instructions in a first address space;

wherein the means for executing the graphics operation request directly includes a second set of computer instructions in an address space different than the first address space.

21. A system according to claim 10, further comprising:

another server, the other server including means for generating messages;

wherein the server processor means includes means for receiving messages from the other server, and means, for translating a received message into a corresponding set of display server messages;

means for determining a set of clients to receive the set of display server messages; and means for submitting the set of display server messages to the set of clients.

22. A system according to claim 21, wherein the emulating means includes:
means for receiving a display server message from the means for submitting the set of display server messages;
means, coupled to the receiving means, for translating the received display server message into a set of messages; and
means, coupled to the translating means, for determining a set of the clients to receive the set of messages produced by the translating means.

23. A system according to claim 21, wherein means for submitting the set of messages to the set of clients includes
means for determining whether one of the clients in the set of clients is the management client.

24. A computer system comprising:
a display;
a client processor for executing client applications; and
a server processor coupled to the display and to the client processor responsive to graphics operation requests generated by said client applications, said graphics operations requests having a format suitable for use by said server processor, the server processor including
a management client emulator providing graphics management functions for the client applications,
a data structure for recording information identifying that a plurality of client applications including the management client are in existence,
a graphics operation request processor which receives graphics operation requests from the client applications and determines whether the graphics operation requests include graphics operations requiring window management and directly executes the graphics operation requests which do not require window management and submits, to the management client emulator, the graphics operation requests that do require window management, and
a translator coupled to the management client emulator, said translator translating said graphics operation requests that do require window management into corresponding sets of graphics requests having a second format suitable for use with a second, different server processor.

* * * * *